United States Patent
Hopkins et al.

(10) Patent No.: US 7,120,248 B2
(45) Date of Patent: Oct. 10, 2006

(54) MULTIPLE PRIME NUMBER GENERATION USING A PARALLEL PRIME NUMBER SEARCH ALGORITHM

(75) Inventors: W. Dale Hopkins, Gilroy, CA (US); Thomas W. Collins, Saratoga, CA (US); Steven W. Wierenga, Sunnyvale, CA (US); Ruth A. Wang, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 624 days.

(21) Appl. No.: 09/818,914

(22) Filed: Mar. 26, 2001

(65) Prior Publication Data

US 2002/0186837 A1 Dec. 12, 2002

(51) Int. Cl.
H04L 9/00 (2006.01)

(52) U.S. Cl. .............. 380/44; 380/46; 380/47; 380/30; 708/250; 708/253; 708/256; 708/490; 708/507; 463/22

(58) Field of Classification Search ............ 463/22; 708/250, 255, 252, 256, 490, 605, 493, 507; 708/253, 604; 380/44, 47, 46, 30
See application file for complete search history.

(56) References Cited

U.S. PATENT DOCUMENTS

| | | | |
|---|---|---|---|
| 4,168,396 A | 9/1979 | Best | 178/22 |
| 4,200,770 A | 4/1980 | Hellman et al. | 178/22 |
| 4,218,582 A | 8/1980 | Hellman et al. | 178/22 |
| 4,278,837 A | 7/1981 | Best | 178/22.09 |
| 4,319,079 A | 3/1982 | Best | 178/22.09 |
| 4,351,982 A * | 9/1982 | Miller et al. | 380/30 |
| 4,405,829 A | 9/1983 | Rivest et al. | 178/22.1 |
| 4,424,414 A | 1/1984 | Hellman et al. | 178/22 |
| 4,433,207 A | 2/1984 | Best | 178/22.09 |
| 4,465,901 A | 8/1984 | Best | 178/22.08 |
| 4,514,592 A | 4/1985 | Miyaguchi | 178/22.11 |
| 4,995,082 A | 2/1991 | Schnorr | 380/23 |
| 5,046,094 A | 9/1991 | Kawamura et al. | 380/46 |
| 5,321,752 A | 6/1994 | Iwamura et al. | 380/24 |

(Continued)

OTHER PUBLICATIONS

A. Menezes et al, Handbook of Applied Cryptography, CRC Press 1996, pp. 133-168.*

(Continued)

*Primary Examiner*—Emmanuel L. Moise
*Assistant Examiner*—Paul Callahan

(57) ABSTRACT

A process is provided for searching in parallel for a plurality of prime number values simultaneously includes the steps of: randomly generating a plurality of k random odd numbers (wherein k is preferably more than 2, but could also be one or more) expressed as $n_{0,0}, n_{1,0}, \ldots n_{((k-1)),0}$, each number providing a prime number candidate; determining a plurality of y additional odd numbers based on each one of the randomly generated odd numbers $n_{0,0}, n_{1,0}, \ldots n_{(k-1),0}$ to provide additional prime number candidates thereby yielding a total number of prime number candidates; sieving the total number of prime number candidates by performing a small divisor test on each of the candidates in order to eliminate candidates revealed to be composite numbers by the small divisor test thereby yielding a sieved number s of candidates; and performing a first probabilistic primality test on each of the sieved number s of candidates, each of the plurality of s first primality tests including an associated exponentiation operation executed by an associated one of a plurality of s of the exponentiation units, the exponentiation operations being performed by the plurality of s exponentiation units substantially simultaneously in order to eliminate candidates revealed to be composite numbers by the primality test thereby yielding a remaining number r of candidates.

51 Claims, 7 Drawing Sheets

U.S. PATENT DOCUMENTS

| | | | |
|---|---|---|---|
| 5,343,527 A | 8/1994 | Moore | 380/4 |
| 5,351,298 A | 9/1994 | Smith | 380/30 |
| 5,421,006 A | 5/1995 | Jablon et al. | 395/575 |
| 5,761,310 A | 6/1998 | Naciri | 380/30 |
| 5,835,594 A | 11/1998 | Albrecht et al. | 380/23 |
| 5,844,986 A | 12/1998 | Davis | 380/4 |
| 6,078,565 A | 6/2000 | Simoni | |
| 6,307,938 B1* | 10/2001 | Matyas et al. | 380/44 |
| 6,330,332 B1* | 12/2001 | Itoh et al. | 380/28 |
| 6,345,098 B1* | 2/2002 | Matyas et al. | 380/46 |
| 6,378,072 B1* | 4/2002 | Collins et al. | 713/187 |
| 6,578,057 B1* | 6/2003 | Hori | 708/200 |
| 6,718,536 B1* | 4/2004 | Dupaquis | 717/126 |

OTHER PUBLICATIONS

Kent White, Ph.D.: "Experiments in Parallel Processing for Undergraduate Students" 29th ASEE/IEEE Frontiers in Education Conference, Nov. 1999, pp. 11a3-1-11a3-4.*

Daniel M. Gordon: "A Survey of Fast Exponentiation Methods" Journal of Alogrithms 27, 129-146, 1998.*

S.A. Vanstone et al., "Using Four-Prime RSA in Which Some of the Bits are Specified," Dec. 8, 1994, Electronics Letter, vol. 30, No. 25. pp. 2118-2119.

C. Couvruer et al., "An Introduction to Fast Generation of Large Prime Numbers," 1982, Philips Journal of Research, vol. 37, Nos. 5-6, pp. 231-264.

Y. Desmedt et al., "Public-Key Systems Based on the Difficulty of Tampering (Is There a Difference Between DES and RSA?)," 1986, Lecture Notes in Computer Science, Advances in Cryptology-CRYPTO '86 Proceedings.

J. J. Quisquater et al., "Fast Decipherment Algorithm.for RSA Public-Key Cryptosystem" Oct. 1982, Electronic Letters, vol. 19, No. 21.

Cetin Kaya Koc, "High-Speed RSA Implementation (Version 2.0)," Nov. 1994, RSA White Paper, RSA Laboratories.

Rivest et al., "A Method for Obtaining Digital Signatures and Public-Key Cryptosystems," Feb. 1978, Communications of the ACM, vol. 21.

PKCS #1: RSA Encryption Standard (Version 1.5), Nov. 1993, RSA Laboratories Technical Note.

M.O. Rabin, "Digitalized Signatures and Public-Key Functions as Intractable as Factorization," Jan. 1979, MIT Laboratory for Computer Science.

R. Lidl et al., "Permutation Polynomials in RSA-Cryptosystems," 1984, Advances in Cryptology—Crypto '83, pp. 293-301.

D. Boneh et al., "Generating a Product of Three Primes with an Unknown Factorization," Computer Science Department, Stanford University.

J. J. Quisquater et al., "Fast Generation of Large Prime Numbers" Jun. 1982, Library of Congress, Catalog No. 72-179437, IEEE Catalog No. 82CH1767 IT, pp. 114-115.

A. J. Menezes et al., "Handbook of Applied Cryptography", 1997, Library of Congress catalog No. 96-27609, pp. 89, 612-613.

P.J. Flinn et al., "Using the RSA Algoithm for Encryption and Digital Signatures: Can You Encrypt, Decrypt, Sign and Verify Without Infringing the RSA Patent?", Jul. 9, 1997, 17 pgs, http://www.cyberlaw.com/rsa.html.

Nemo, "RSA Moduli Should Have 3 Prime Factors", 1996.

* cited by examiner

| LENGTH OF PRIMES | NUMBER OF PRIMES | THEORETICAL DISTANCE | MEAN DISTANCE BETWEEN PRIMES | PERCENT ERROR |
|---|---|---|---|---|
| 512 | 50 | 177.4456782 | 233.94 | 31.84% |
|  |  |  | 165.29 | 6.85% |
|  |  |  | 170.51 | 3.91% |
|  | 100 |  | 162.11 | 8.64% |
|  |  |  | 165.12 | 6.95% |
|  |  |  | 192.71 | 8.60% |
| 768 | 50 | 266.1685173 | 301.82 | 13.39% |
|  |  |  | 286.44 | 7.62% |
|  |  |  | 247.71 | 6.93% |
|  | 100 |  | 342.28 | 28.60% |
|  |  |  | 237.12 | 10.91% |
|  |  |  | 229.46 | 13.79% |
| 1024 | 50 | 354.8913564 | 452.54 | 27.52% |
|  |  |  | 264.02 | 25.61% |
|  |  |  | 344.74 | 2.86% |
|  | 100 |  | 370.6 | 4.43% |
|  |  |  | 388.56 | 9.49% |
|  |  |  | 300.70 | 15.27% |
| 2048 | 25 | 709.7827129 | 741.28 | 4.44% |
|  |  |  | 771.52 | 8.70% |
|  | 50 |  | 712.48 | 0.38% |
|  |  |  | 900.6 | 26.88% |
|  |  |  | 830.16 | 16.96% |
|  |  |  | 482.92 | 31.96% |

FIG. 1

| LENGTH OF PRIMES | NUMBER OF PRIMES | THEORETICAL VARIANCE | CALCULATED VARIANCE | PERCENT ERROR |
|---|---|---|---|---|
| 512 | 50 | 31309.52304 | 37319.7 | 19.20% |
|  |  |  | 16701.1 | 46.66% |
|  |  |  | 1624.6 | 48.12% |
|  | 100 |  | 26020.4 | 16.89% |
|  |  |  | 24339.9 | 22.26% |
|  |  |  | 32702.7 | 4.45% |
| 768 | 50 | 70579.5111 | 81592.6 | 15.60% |
|  |  |  | 73697.8 | 4.42% |
|  |  |  | 56323.1 | 20.20% |
|  | 100 |  | 97383.7 | 37.98% |
|  |  |  | 49077.6 | 30.46% |
|  |  |  | 38380.1 | 45.62% |
| 1024 | 50 | 125592.9835 | 220257 | 75.37% |
|  |  |  | 64156.2 | 48.92% |
|  |  |  | 128506 | 2.32% |
|  | 100 |  | 137055 | 9.13% |
|  |  |  | 135813 | 8.14% |
|  |  |  | 72380.9 | 42.37% |
| 2048 | 25 | 503081.7168 | 342774 | 31.87% |
|  |  |  | 503015 | 0.01% |
|  |  |  | 393666 | 21.75% |
|  | 50 |  | 684081 | 35.98% |
|  |  |  | 1091124 | 116.89% |
|  |  |  | 265514 | 47.22% |

FIG. 2

| LENGTH OF PRIMES | NUMBER OF PRIMES | N=8 | N=12 | N=16 |
|---|---|---|---|---|
| 512 | 50 | 79.3055% | 84.7671% | 88.5867% |
|  | 100 | 78.4742% | 84.8952% | 88.1413% |
|  | 150 | 78.8723% | 85.1063% | 87.8524% |
| 768 | 50 | 79.2572% | 85.3223% | 88.7526% |
|  | 100 | 78.9617% | 85.5717% | 88.8592% |
|  | 150 | 79.2732% | 85.5819% | 88.9805% |
| 1024 | 50 | 79.6857% | 86.3095% | 89.0923% |
|  | 100 | 78.9191% | 85.5856% | 89.1710% |
|  | 150 | 79.3101% | 85.5522% | 89.1837% |
|  | Average | 79.1177% | 85.4102% | 88.7355% |

MULTIPLE PRIME NUMBER GENERATION USING A PARALLEL PRIME NUMBER SEARCH ALGORITHM

CROSS REFERENCE TO RELATED APPLICATIONS

Reference is made to U.S. Pat. No. 5,848,159, Dec. 8, 1998, entitled "Public Key Cryptographic Apparatus and Method", which is incorporated by reference.

BACKGROUND OF THE INVENTION

1. Field of the Invention

The present invention relates generally to prime number generation, and more specifically to a system and method for efficiently searching for and generating prime numbers suitable for use in cryptographic systems.

2. Description of the Prior Art

Many different types of cryptographic security systems require a means for determining large prime numbers. As an example, public key cryptographic schemes require large prime numbers to produce cryptographic keys which are used to encipher and decipher data for the purposes of guaranteeing the confidentiality, reliability, and authenticity of information to be stored or transferred from one place to another. As an example, a bank requires some means for keeping financial transactions confidential, and for guaranteeing the authenticity of a financial transaction to prevent the wrongful transfer of money.

In a typical cryptographic scheme, an encryption process is performed to transform a plaintext message M into ciphertext C, and a decryption process is performed to transform the ciphertext C back into plaintext. In a public key cryptographic scheme, encryption and decryption processes are performed using a pair of cryptographic keys. In the most common application, a public key E defined as the pair $\{e, n\}$ is used to encrypt the message, and a private key D defined as the pair $\{d, n\}$ is typically used to decrypt the ciphertext. It is important to note that the public key, which may be publicly known, cannot be used to decrypt the ciphertext. Only the private key D, which is kept secret, can be used for decryption of a message encrypted by the public key E. As an example, consider that a sender needs to send an encrypted message M to a recipient. The recipient publishes his or her public key, making it known at least to the sender, and keeps his or her private key secret. The sender then uses the public key to encrypt a message, and send the encrypted message to the recipient who then uses the private key to decrypt the message. Any third party interpreting the encrypted message is unable to decrypt the message without knowing the private key. As further explained below, although the public key is related to the private key, it is computationally difficult to determine the private key from the public key.

One example of a public key cryptography system is the classic "RSA" scheme which capitalizes on the relative ease of generating a composite number as the product of two large prime numbers, as compared with the difficulty of factoring that composite number into its constituent primes. Another example of a public key cryptography system is the Multiprime extension of the RSA system which is described in U.S. patent application Ser. No. 09/328,726, filed on Oct. 26, 1998, by Collins et al. The RSA scheme uses a public key E including a composite number n and a number e, where n is defined by relationship (1), below $$n = p \cdot q \quad (1)$$

where the factors p and q are different prime numbers, and e is a number relatively prime to (p−1) and (q−1). Importantly, the sender has access to the public key E (including n and e), but not to the prime factors p and q, which are kept secret by the owner.

The sender enciphers a message M (M<n) to create ciphertext C by computing the exponential relationship (3), below.

$$C \equiv M^e (\bmod n) \quad (3)$$

wherein the number e provides an exponent, and the composite number n provides a modulus. The recipient of the ciphertext C may decrypt the message M using the private key D, which includes a number d and the modulus n, in accordance with relationship (4), below.

$$M \equiv C^d (\bmod n) \quad (4)$$

The number d, which provides a decryption exponent, is a multiplicative inverse of $$e(\bmod 1 \; cm((p-1), (q-1))) \quad (5)$$

so that $$e \cdot d \equiv 1 (\bmod 1 \; cm((p-1), (q-1))) \quad (6)$$

where $1 \; cm((p-1), (q-1))$ is the least common multiple of the numbers (p−1) and (q−1).

Most commercial implementations of the RSA cryptography scheme employ a different although equivalent relationship (7), below, for determining the decryption exponent d.

$$d \equiv e^{-1} \bmod((p-1)(q-1)) \quad (7)$$

The security of this public key cryptographic system relies on the fact that the prime factors p and q of the composite number n are required to compute the private key d, and it is computationally difficult to factor the composite number n into its prime factors p and q.

Cryptanalysis refers to techniques for deciphering encrypted data without prior knowledge of the keys being used. From the time a security scheme becomes publicly known and used, it is subjected to unrelenting attempts to break it. Security levels for encryption schemes are continually being raised in order to combat increasingly more intelligent cryptanalytic attacks.

Cryptanalysts are often more interested in discovering the keys used to decrypt data than in merely discovering the contents of a single message. The most basic method of finding a decryption key is to try all possibilities by an exhaustive key search until the correct key is found. A more sophisticated method is to attempt to factor the modulus n. One method for increasing the security level provided by a public key cryptography system is to increase the length $L_n$ (i.e., size in bits) of the modulus n so that its prime factors p and q cannot be discovered by an exhaustive search or by practical factoring methods. As an example, very large modulus numbers having a long length $L_n$ (e.g., on the order of 512 bits, 768 bits, 1024 bits, and 2048 bits) are now being used in cryptographic keys. In the classic 2-prime RSA encryption algorithm, each of the prime factors p and q has a length $L_p$ which is equal to half the bit length of the modulus n. For example, if the modulus has a length of 1024 bits, then each of the prime factors would have a length $L_p$ of 512 bits. Using cryptographic keys of this size requires a significant amount of computer resources to perform the encryption and decryption operations, but also require much greater resources of a potential attacker to discover the decryption key.

One tradeoff resulting from use of such large cryptographic key values is that the amount of computer processing power required to create a new cryptographic key pair increases as the lengths of the cryptographic key values increases.

In particular, an increasingly important performance issue is the time and processing power required for prime number generation. For purposes of the present invention, prime number generation refers to processing steps involved in searching for and verifying large prime numbers for use in cryptographic keys. Testing the primality of large candidate numbers is very processing intensive. Efficient prime number generation is becoming more important due to several technical developments besides the demand for increased cryptographic key lengths. First, encryption and decryption processes are now being employed for use with devices, such as cell phones and personal digital assistants (PDA's)), that do not provide a large amount of processing power. Therefore, it would be desirable to reduce the processing time required for large prime number generation so that the processing resources of even a cell phone or PDA could accomplish the task. Second, there is an ever increasing demand for more cryptographic keys. Smart cards are now being provided with unique public keys.

The most common technique for finding prime numbers is a search method which generally includes the steps of: generating a random odd number $n_0$ in a predefined interval (e.g., the interval between $2^{L-1}$ and $2^L$); testing if the randomly generated number $n_0$ is a prime number; and if $n_0$ is not a prime number, selecting another candidate $n_1$ in the predefined interval and determining if it is a prime number; and repeating these steps until a prime number is found. A large amount of time and processing power is required to find prime number because the relative frequency of occurrence of prime numbers decreases with size. The relative frequency of a randomly generated number being prime depends on the size of the number. As an example, for a random number $n_0$ generated in the interval between $2^{L-1}$ and $2^L$, the probability that $n_0$ is prime is roughly equal to $1/L$ or more approximately $1/(L.\ln 2)$. Therefore, the probability that a generated number having a length L is a prime number is inversely proportional to the length of the number. This presents an important problem in public key type cryptography systems where the level of security is dependent at least in part on the length L of the cryptographic keys because increasing the length L to enhance the level of security results in a decrease in the performance of the prime number generation system.

Primality testing, that is the sub-process of determining if a randomly generated number no is a prime number, is the most processing intensive aspect of prime number generation. Primality testing may be accomplished using any one of a wide variety of different techniques, or using a combination of different techniques. Probabilistic primality tests provide methods by which arbitrary positive integers are tested to provide partial information regarding their primality. As further explained below, conventional probabilistic primality testing typically utilizes a plurality of sequentially executed primality tests, each being performed including an exponentiation with respect to an associated base integer $\alpha_i$ where $1 \leq i \leq t$. Any single execution of a probabilistic primality test on a number results in a declaration of the number as being either a possible prime or a definite composite. A result of execution of a primality test which declares the number to be composite establishes this with certainty, while a result which declares the number to be a possible prime does not establish primality with certainty. However, execution of a plurality of t of successive independent primality tests, each indicating that the integer is may be prime, provides for a cumulative probability of error that decreases as the number t increases. If the test is run t times independently on a composite number n, the probability that n is declared possible prime all t times (i.e., the probability of error) is at most $(\frac{1}{2})^t$, and may be much smaller.

Commonly used probabilistic primality tests include the Fermat primality test and the Miller-Rabin primality test. Fermat's theorem asserts that if n is a prime, and $\alpha_i$ is any integer, $1 \leq \alpha_i \leq n-1$, then relationship (8), below, is true.

$$\alpha_i^{n-1} \equiv 1 \pmod{n} \tag{8}$$

If congruency is not found in accordance with relationship (8), that is if the statement defined by relationship (8) is not true, then $\alpha_i$ is said to be a "Fermat witness" to compositeness for n. If n is a composite number, and congruency is found in accordance with relationship (8), then n is said to be a pseudoprime to the base $\alpha_i$, and the integer $\alpha_i$ is called a "Fermat liar" or a non-witness to the compositeness of n.

Computer readable instructions for implementing each iteration of relationship (8) may be executed by a processor to determine the veracity of relationship (8) which yields a result declaring either probable primality or compositeness. As mentioned above, for probabilistic primality tests such as the Fermat test, if the results of relationship (8) declare "prime", then there is not sufficient evidence that the number n is indeed prime. Therefore, exponentiation tests in accordance with relationship (8) are typically repeated t times for $\alpha_1, \alpha_2, \ldots \alpha_t$ at to determine if each of the t tests declares "prime" in order to achieve an acceptable level of certainty that the candidate is a prime. It is still true that if the prime number candidate passes all of the congruency tests for $\alpha_1, \alpha_2, \ldots \alpha_t$, then there is no guarantee that the candidate is a prime.

Because relationship (8) defines an exponentiation, a significant amount of time and processing resources are required to execute instructions for implementing relationship (8). In order to accelerate the prime number generation process, conventional prime number generation systems typically provide a processor and a single exponentiation unit communicatively coupled with the processor in order to reduce the burden on the processor and speed up the prime number generation process as further explained below. The exponentiation unit is typically an arithmetic logic unit (ALU).

In accordance with conventional prime number generation methods, the generalized steps of randomly generating an odd number $n_0$ and determining if the number $n_0$ is a prime are executed sequentially using the arithmetic unit. If the number $n_0$ is determined to be composite, a next prime number $n_1$ in a sequence of prime number candidates is generated by adding two to the previous number $n_0$, and it is then determined if the number $n_1$ is a prime. Furthermore, in accordance with conventional prime number generation methods, the t exponentiation tests in accordance with relationship (8) for $\alpha_1, \alpha_2, \ldots \alpha_t$ are typically executed in a sequential manner using the arithmetic unit to determine if each of the t tests declares "prime".

Cryptographic key generation in accordance with conventional methods is very time consuming and processing intensive even with the use of a fast arithmetic unit. Approximately 20 to 30 seconds are required to generate a cryptographic key value in a device such as a cell phone or PDA using conventional methods. This is partially due to the fact that the prime numbers in a predefined interval (e.g., the interval between $2^{L-1}$ and $2^L$) are far apart, and it is therefore necessary to perform tests on approximately L candidates that are determined to be composite before finding a prime number.

What is needed is a system and method that enables fast and efficient probabilistic primality testing, and reduced computational effort for calculating exponentiations thereby providing fast and efficient generation of large random prime numbers.

SUMMARY OF THE INVENTION

It is an object of the present invention to provide a system and method that enables fast and efficient probabilistic primality testing.

It is another object of the present invention to provide a system and method that enables fast and efficient generation of large random prime numbers.

A further object of the present invention if to provide a system for reducing the computational effort for calculating exponentiations in primality testing.

Yet another object of the present invention is to provide a system and method that provides fast and efficient cryptographic key generation for use in cryptographic security schemes.

Briefly, a presently preferred embodiment of the present invention provides a system and method for prime number generation that provides improved performance and efficiency in generating cryptographic keys for use in either Multi-prime cryptographic systems or classic two-prime cryptographic systems. However, the Applicants have determined that Multi-prime cryptographic systems allow for faster and more efficient prime number generation because for a modulus of give length the density of prime numbers is greater in intervals searched in Multi-Prime cryptographic systems than in the intervals searched in classic two-prime cryptographic systems.

The prime number generation system of the present invention generally includes: a processing means operative to randomly generate a plurality of random odd numbers each providing a prime number candidate, and to provide a set of test parameters associated with a probabilistic primality test to be performed on each one of the plurality of randomly generated numbers, each set of the test parameters including the associated randomly generated number; and a plurality of exponentiation units each being communicatively coupled with the processing means, and being responsive to an associated one of the sets of test parameters, and operative to perform an exponentiation operation based on the associated set of test parameters, and also operative to generate a primality test result signal declaring the associated prime number candidate to be either composite or prime with reference to an associated base value, the exponentiation units being operative to perform the exponentiation operations substantially simultaneously and in parallel. The processing means is responsive to the primality test result signals, and operative to process the test results for the purpose of eliminating randomly generated numbers declared to be composite in accordance with a search for prime number values.

A presently preferred embodiment of a process of searching in parallel for a plurality of prime number values simultaneously includes the steps of: randomly generating a plurality of k random odd numbers (wherein k is preferably more than 2, but could also be one or more) expressed as $n_{0,0}, n_{1,0}, \ldots n_{(k-1),0}$, each number providing a prime number candidate; determining a plurality of y additional odd numbers based on each one of the randomly generated odd numbers $n_{0,0}, n_{1,0}, \ldots n_{(k-1),0}$ to provide (k×y) additional prime number candidates $(n_{0,1}, n_{0,2}, \ldots n_{0,y}), (n_{1,1}, n_{1,2}, \ldots n_{1,y}), \ldots (n_{(k-1),1}, n_{(k-1),2}, \ldots n_{(k-1),y})$ thereby yielding a total number of (k×(y+1)) prime number candidates; sieving the (k×(y+1)) prime number candidates by performing a small divisor test on each of the candidates in order to eliminate candidates revealed to be composite numbers by the small divisor test thereby yielding a sieved number s of remaining candidates; optionally eliminating each of the sieved prime number candidates $p_c$ which does not satisfy a suitability requirement that GCD (e, $p_c$−1)=1 as further explained below; and performing a first probabilistic primality test on each of the sieved number s of candidates, each of the plurality of s first primality tests including an associated exponentiation operation executed by an associated one of a plurality of s of the exponentiation units, the exponentiation operations being performed by the plurality of s exponentiation units substantially simultaneously and in parallel in order to eliminate candidates revealed to be composite numbers by the primality test thereby yielding a remaining number r of candidates.

In an embodiment, the step of determining a plurality of y additional odd numbers based on each one of the randomly generated odd numbers $n_{0,0}, n_{1,0}, \ldots n_{(k-1),0}$ includes successively adding two to each of said randomly generated odd numbers $n_{0,0}, n_{1,0}, \ldots n_{(k-1),0}$ to provide (k×y) additional prime number candidates expressed as $(n_{0,1}=n_{0,0}+2, n_{0,2}=n_{0,0}+4, \ldots n_{0,y}=n_{0,0}+(y \cdot 2)), (n_{1,1}=n_{1,0}+2, n_{1,2}=n_{1,0}+4, \ldots n_{1,y}=n_{1,0}+(y \cdot 2)), \ldots (n_{(k-1),1}=n_{(k-1),0}+2, n_{(k-1),2}=n_{(k-1),0}+4, \ldots n_{(k-1),y}=n_{(k-1),0}+(y \cdot 2))$.

The process further includes a step of performing a plurality of t−1 additional probabilistic primality tests on each of the remaining number r of candidates, each of the plurality of (r×(t−1)) primality tests including an associated exponentiation operation executed by an associated one of a plurality of (r×(t−1)) of the exponentiation units. The (r×(t−1)) exponentiation operations are performed by the plurality of (r×(t−1)) exponentiation units substantially simultaneously and in parallel in order to eliminate further candidates revealed to be composite numbers.

The reason for performing a first primality test on all of the candidates before performing additional primality tests is that is has been observed in research conducted by the Applicants, and described herein, that well over 99% of composite candidates are revealed to be composite as a result of the first primality test. Therefore, it is generally unnecessary to perform more than one probabilistic primality test on each of the candidates in order to eliminate it as being composite.

An important advantage of the prime number generation system and method of the present invention is that it provides fast and efficient probabilistic primality testing, and therefore provides fast and efficient searching for large random prime numbers. This prime number generation system and method provides for reducing the computational effort and time required for generating cryptographic keys for use in cryptographic security systems.

The foregoing and other objects, features, and advantages of the present invention will be apparent from the following detailed description of the preferred embodiment which makes reference to the several figures of the drawing.

IN THE DRAWING

FIG. 1 is a table diagram illustrating a comparison between theoretical and calculated distances between prime numbers in intervals of numbers defined for several different cryptographic key length values, and for varying numbers of primes found;

FIG. 2 is a table diagram illustrating a comparison between theoretical and experimental variances of the distance between primes in intervals of numbers defined for several different cryptographic key length values, and for varying numbers of primes found;

DETAILED DESCRIPTION OF THE PREFERRED EMBODIMENTS

Figure 3:
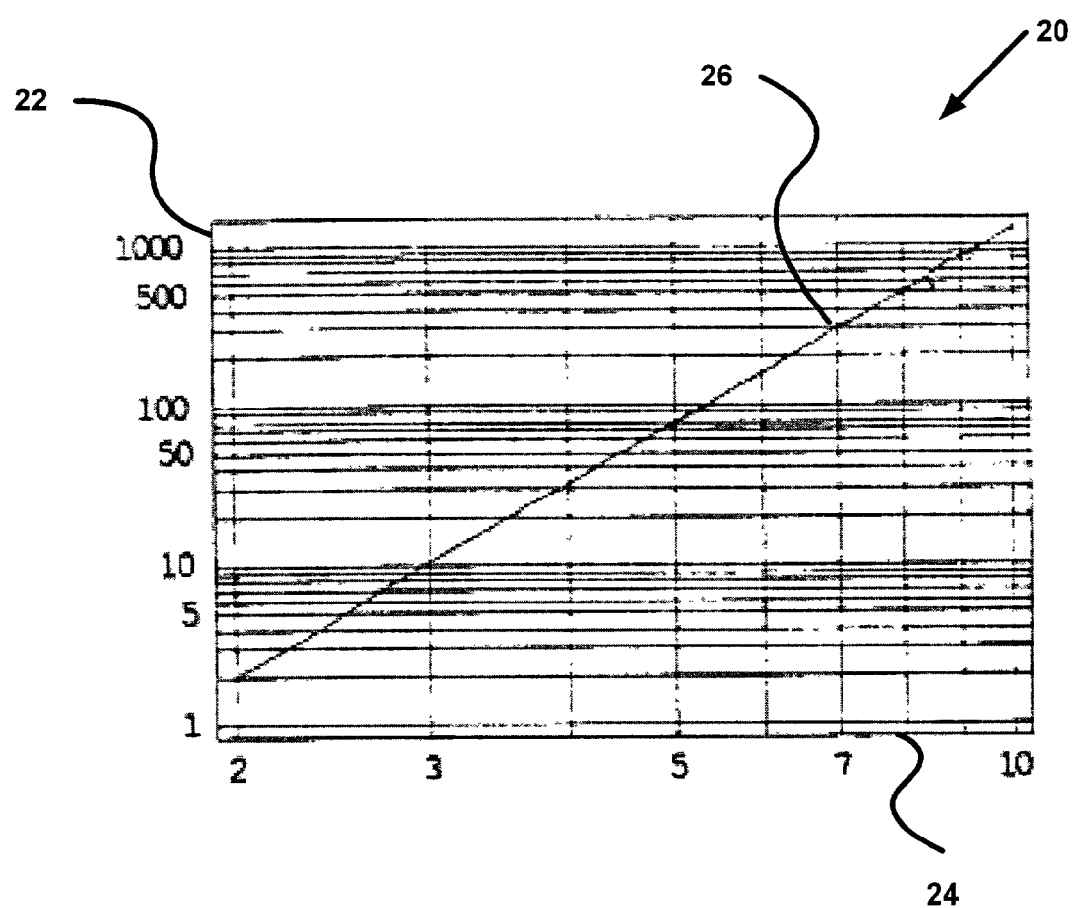
FIG. 3 is a graph illustrating values of a speed up factor in prime number generation performance of Multi-prime key generation systems in accordance with the present invention over conventional two-prime key generation systems as a function of values of k ranging from 2 through 10 on a logarithmic scale.

As discussed above, many different types of cryptographic security schemes require a system and method for randomly generating large prime numbers. As an example, in public key cryptographic schemes, large prime numbers must be generated to construct cryptographic keys which are used to encipher and decipher data. The present invention provides a system and method for efficient parallel prime number searching. In a preferred embodiment, the system and method of the present invention is employed for generating prime-based cryptographic keys for use in any one of a variety of different types of cryptographic systems.

In order to produce an efficient prime number searching process, the applicants have investigated the nature of prime number occurrences. Three main topics related to prime number generation efficiency were investigated and analyzed by the Applicants. As further explained below, the present invention provides: (1) an expression for the density of prime numbers within a given interval, and experimentally derived data verifying this expression; (2) a derivation for an expected distribution of primes within a given interval; and (3) a mathematical expression comparing the performances of Multi-prime key generation systems and classic RSA two prime number generation systems. As described below, the present invention also provides an analysis describing the effects of filtering prime candidates against smaller, possible prime divisors, before performing probabilistic primality tests requiring exponentiation. This was done in order to decrease the amount of CPU cycles required to execute primality testing.

1. Multi-Prime Technology:

U.S. patent application Ser. No. 09/328,726, filed on Oct. 26, 1998, by Collins et al. describes a Multi-Prime cryptographic scheme which uses a composite number having more than two prime factors. In accordance with the Multi-Prime cryptographic scheme, a public key E (including a composite number n and a number e) is determined. A plurality of k (wherein k is an integer greater than 2) random large, distinct prime numbers, $p_1, p_2, \ldots p_k$ are developed and checked to ensure that each of $(p_1-1), (p_2-1), \ldots,$ and $(p_k-1)$ is relatively prime to the number e. Preferably, the prime numbers $p_1, p_2, \ldots p_k$ are of an equal length L in bits. Then, the composite number n is defined in accordance with relationship (9) below, $$n = p_1 \cdot p_2 \cdot \ldots \cdot p_k \qquad (9)$$

As further explained below, the composite number n provides a modulus for encrypting and decrypting, and the prime numbers $p_1, p_2, \ldots p_k$ are referred to as factors of the modulus n. The prime numbers $p_1, p_2, \ldots p_k$ must satisfy three general criteria in order to be used in a Multi-Prime cryptographic system. The prime numbers p1, p2, ... pk must satisfy the criteria of being distinct, random, and suitable for use in the Multi-Prime cryptographic system.

In order to be distinct, the prime numbers $p_i = p_1, p_2, \ldots p_k$ must satisfy the constraint (10), below.

$$p_i \neq p_j \text{ for } i \neq j \qquad (10)$$

In order to be considered random, each of the prime numbers must be produced with equal likelihood and uniformly across the allowed range of values, and they must be statistically independent, that is the prime numbers must satisfy the constraint (11), below:

$$P(p_j = p_B | p_i = p_A) = P(p_j = p_B) \qquad (11)$$

wherein $P(p_j = p_B)$ is the probability that $p_j$ takes the value $p_B$ and $P(p_j = p_B | p_i = p_A)$ is the probability that $p_j$ takes the value $p_B$ knowing that $p_i$ has the value $p_A$.

In order to be suitable for use in the Multi-Prime cryptographic system, the prime numbers $p_i = p_1, p_2, \ldots p_k$ must satisfy the constraints (12a) and (12b), below.

$$2^{L-1} < p_1 \cdot p_2 \cdot \ldots \cdot p_k < 2^L \qquad (12a), \text{ and}$$

e does not have any common divisors with $p_i - 1$ (12b)

Stated alternatively, constraint (12b) requires that each prime $p_i$ must satisfy the relationship; $GCD(e, p_1-1)=1$. This constraint requires that the public exponent e and $(p_i-1)$ be relatively prime. If e and $(p_1-1)$ have a common divisor greater than 1, then $p_i$ must be rejected as a suitable key prime.

It is also noted here that there is an alternative statement of this constraint on the primes which may be considered for use in the RSA cryptographic system. This constraint is reflected in the linear congruency of relationship (13), below.

$$e \cdot d \equiv 1 \mod \phi(n) \qquad (13)$$

Stated alternatively, constraint (13) requires that each prime $p_i$ must satisfy the relationship, $GCD(e, p_i-1)=1$. This constraint requires that the public exponent e and $(p_i-1)$ be relatively prime. If e and $(p_1-1)$ have a common divisor greater than 1, then $p_i$ must be rejected as a suitable key prime.

It is also noted here that there is an alternative statement of this constraint on the primes which may be considered for use in the RSA cryptographic system. This constraint is reflected in the linear congruency of relationship (14), below.

$$e \cdot d \equiv 1 \mod \phi(n) \qquad (14)$$

where $\phi(n)$ is Euler's totient function. Here, d is the private key and is the multiplicative inverse of e mod $\phi(n)$ where e is the public key exponent. The Totient function may be expressed in accordance with relationship (15), below.

$$\phi(n)=(p_1-1)\cdot(p_2-1)\ldots\cdot(p_k-1) \qquad (15)$$

where $n=p_1\cdot p_2\cdot\ldots\cdot p_k$.

The linear congruency of relationship (14), above has a unique solution d if and only if $GCD(e, \phi(n))=1$. That is, e must be relatively prime to $\phi(n)$. This means that e must not have common divisors with $(p_1-1)$ or $(p2_1-1)\ldots$ or $(p_k-1)$.

A decryption key D, including the composite number n and a number d, is established in accordance with relationship (16), below $$d\equiv e^{-1}\bmod((p_1-1)(p_2-1)\ldots(p_k-1)) \qquad (16)$$

In the most common application of the multi-prime cryptographic scheme, a plaintext message M is encoded to ciphertext C by an encoding process using the public key E wherein the prime factors $p_1, p_2, \ldots p_k$ are not known by the sender. In this application, the encoding process of the multi-prime scheme is performed in accordance with relationship (3), reprinted below.

$$C\equiv M^e(\bmod\ n), \qquad (3)$$

wherein $$0\leq M\leq n-1,$$

The decoding process of the Multi-Prime scheme provides for decoding the ciphertext word C to a receive message word M. The decoding step is usually performed using the number d as a decryption exponent that is defined by relationship (17) below.

$$d\equiv e^{-1}\bmod((p_1-1)(p_2-1)\ldots(p_k-1)), \qquad (17)$$

The multi-prime cryptographic decoding process includes a first step of defining a plurality of k sub-tasks in accordance with relationships (17) below.

$$M_1'\equiv C_1^{d_1}(\bmod\ p_1),$$

$$M_2'\equiv C_2^{d_2}(\bmod\ p_2),$$

$$M_k'\equiv C_k^{d_k}(\bmod\ p_k),$$

wherein $$C_1\equiv C(\bmod\ p_1),$$

$$C_2\equiv C(\bmod\ p_2),$$

$$C_k\equiv C(\bmod\ p_k),$$

$$d_1\equiv d(\bmod(p_1-1)),$$

$$d_2\equiv d(\bmod(p_2-1)),\text{ and}$$

$$d_k\equiv d(\bmod(p_k-1)) \qquad (17)$$

The above recited sub-tasks are then solved to determine results $M_1', M_2', \ldots M_k'$ which are subsequently combined in accordance with a combining process to produce the receive message word M', whereby M'=M. The Chinese Remainder Theorem provides a mathematical proof which proves the existence of a unique solution to the sub-tasks described in accordance with the congruency relationships (17) above.

U.S. patent application Ser. No. 09/328,726 teaches the use of either a recursive combining process or a summation process for combining the results $M_1', M_2', \ldots M_k'$ to produce the receive message word M'.

The recursive combining process may be performed in accordance with relationship (18), below.

$$Y_i=Y_{i-1}+((M_i'-Y_{i-1})(w_1^{-1}\bmod p_1)\bmod p_1)\cdot w_i\bmod n, \qquad (18)$$

wherein $2\leq i\leq k$, and $M'=Y_k$, $Y_1=M_1'$, and $$w_i=\prod_{j<i}p_j.$$

The summation process may be performed in accordance with relationship (19), below.

$$M'\equiv\sum_{i=1}^{k}M_i'(w_i^{-1}\bmod p_i)w_i\bmod n, \qquad (19)$$

wherein $$w_i=\prod_{j\neq i}p_j.$$

2. The Density of Primes Relative to Odd Integers in an Interval:

Let $\pi(x)$ denote the number of primes $\leq x$. The Prime Number Theorem states:

$$\lim_{x\to\infty}\frac{\pi(x)}{x/\ln x}=1$$

Therefore, for large x, $$\pi(x)\cong\frac{x}{\ln x}$$

The interval of representable decimal integers given a binary string of length L-bits is $(2^{L-1}, 2^L)$. Note that this interval does not include the integer $2^L$. However, for purposes of simplifying calculations, the endpoint is included in the interval. This does not significantly affect the results for large values of L.

The number of odd integers in the interval $(2^{L-1}, 2^L)$ is:

$$\frac{2^L-2^{L-1}}{2}=\frac{2^{L-1}(2-1)}{2}=2^{(L-2)}$$

The number of primes in $(2^L-2^{L-1})$ is expressed in accordance with relationship (20) which is developed by:

2.1.1 The Number of Primes in an Interval

The number of primes less than a number x can be closely approximated by the expression:

$$\pi(x)\simeq\frac{x}{\ln x}$$

Thus, the number of primes in the interval $(2^{L-1}, 2^L)$ can be calculated as follows:

Number of Primes $\leq 2^L$ − Number of Primes $\leq 2^{L-1}$ $$= \pi(2^L) - \pi(2^{L-1})$$
$$= \frac{2^L}{\ln 2^L} - \frac{2^{L-1}}{\ln 2^{L-1}}$$
$$= \frac{2^L}{L\ln 2} - \frac{2^{L-1}}{(L-1)\ln 2}$$
$$= \frac{1}{\ln 2}\left(\frac{2^L}{L} - \frac{2^{L-1}}{(L-1)}\right)$$
$$= \frac{2^L}{\ln 2}\left(\frac{1}{L} - \frac{1}{2L-1}\right)$$
$$= \frac{2^L}{\ln 2}\left(\frac{2L-2-L}{2L(L-1)}\right)$$

Number of Primes $= \frac{2^L}{\ln 2}\left(\frac{L-2}{2L(L-1)}\right)$

2.1.2 The Density of Primes Relative to the Number of Odd Integers in an Interval $$f(L) \triangleq \frac{\text{Number of primes in } [2^{L-1}, 2^L]}{\text{Number of odd integers in } [2^{L-1}, 2^L]}$$

$$= \frac{\frac{2^L}{\ln 2}\left(\frac{L-2}{2L(L-1)}\right)}{2^{L-2}}$$

$$= \frac{\frac{2^{L-1}}{\ln 2}\left(\frac{L-2}{L(L-1)}\right)}{2^{L-2}}$$

$$= \frac{2^{L-1}}{\ln 2} \frac{1}{2^{L-2}}\left(\frac{L-2}{L(L-1)}\right)$$

$$= \frac{2}{\ln 2}\left(\frac{L-2}{L(L-1)}\right)$$

$$= \frac{2}{L\ln 2}\left(\frac{L-2}{L-1}\right)$$

$$f(L) \simeq \frac{2}{L\ln 2}$$

2.3.1 The Distribution of the Distance Between Primes

Let $\{x_n\}$ represent the sequence of prime candidates that are tested. Let $p$ be the probability that $x_n$ is a prime: $P\{x_n \text{ is prime}\}=p$. Suppose $x_1, x_2, \ldots, x_{t-1}$ are each composite numbers and $x_t$ is the next prime. Let $T$ be the random stopping index when sequencing through $\{x_n\}$. The probability that $x_T$ is the next prime number is:

$$P\{T=t\} = p(1-p)^{t-1}$$

The expected value of T, which is needed for the calculation of the variance, is:

$$E[T] = \sum_{t=1}^{\infty} P\{T=t\} \cdot t$$

$$= \sum_{t=1}^{\infty} p(1-p)^{t-1} \cdot t \quad \left(\text{Note: } \frac{d}{dp}(1-p)^t = -t(1-p)^{t-1}\right)$$

-continued $$= -p\sum_{t=1}^{\infty} \frac{d}{dp}(1-p)^t$$

$$= -p\frac{d}{dp}\left(\sum_{t=1}^{\infty} \frac{d}{dp}(1-p)^t\right)$$

$$= -p\frac{d}{dp}\left(\sum_{t=0}^{\infty}(1-p)^t - 1\right)$$

$$= -p\frac{d}{dp}\left(\frac{1}{p} - 1\right)$$

$$= -p\left(\frac{-1}{p^2}\right)$$

$$E[T] = \frac{1}{p}$$

2.3.2 The Variance of the Distance Between Primes

The variance of T can be computed as follows:

$$\sigma_T^2 = E(T - E[T])^2$$
$$= E(T^2 - 2T \cdot E[T] + E[T]^2)$$
$$= E[T^2] - 2(E[T]^2) + E([T])^2$$
$$= E[T^2] - E([T])^2$$
$$\sigma_T^2 = E[(T+1)T] - E[T] - E([T])^2$$

Computing $E((T+1)T)$, $$E[(T+1)T] = \sum_{t=1}^{\infty}(t+1)t \cdot (1-p)^{t-1}p$$

$$\left(\text{Note: } \frac{d}{dp}(1-p)^{t+1} = -(t+1)(1-p)^t \right.$$
$$\left. \frac{d^2}{dp^2}(1-p)^{t+1} = t(t+1)(1-p)^{t-1}\right)$$

$$= p\sum_{t=1}^{\infty} \frac{d^2}{dp^2}(1-p)^{t+1}$$

$$= p\frac{d^2}{dp^2}\sum_{t=1}^{\infty}(1-p)^{t+1}$$

$$= p\frac{d^2}{dp^2}\left(\sum_{t=0}^{\infty}(1-p)^t - 1 - (1-p)\right)$$

$$= p\frac{d^2}{dp^2}\left(\frac{1}{p} - 1 - (1-p)\right)$$

$$= p\frac{d^2}{dp^2}\left(\frac{1}{p} - 1 - 1 + p\right)$$

$$= p\frac{d}{dp}\left(\frac{-1}{p^2} + 1\right)$$

$$= p\frac{2}{p^3}$$

$$E[(T+1)T] = \frac{2}{p^2}$$

Substituting this back into the calculation, $$\sigma_T^2 = E[(T+1)T] - E[T] - E([T])^2$$
$$= \frac{2}{p^2} - \frac{1}{p} - \frac{1}{p^2}$$
$$= \frac{1}{p^2} - \frac{1}{p}$$
$$\sigma_T^2 = \frac{1-p}{p^2}$$

The density of primes relative to the number of odd integers in an interval can be defined by relationship (21) which is developed by:

$$f(L) \triangleq \frac{\text{Number of primes in}[2^{L-1}, 2^L]}{\text{Number of odd integers in}[2^{L-1}, 2^L]} \quad (21)$$
$$= \frac{\frac{2^L}{\ln 2}\left(\frac{L-2}{2L(L-1)}\right)}{2^{L-2}}$$
$$= \frac{2}{L\ln 2}\left(\frac{L-2}{L-1}\right) \left(\text{Note: } \frac{L-2}{L-1} \approx 1 \text{ for large } L\right)$$
$$\approx \frac{2}{L\ln 2} \approx \frac{2.89}{L}$$

Relationship (21) provides a very good approximation for the density of primes relative to the number of odd integers in the interval $(2^{L-1}, 2^L)$.

ii. The Distances Between Primes Relative to Odd Integers in an Interval

The theoretical average distance between primes in an interval is simply the inverse of the prime density within that interval.

Relationship (22) below provides an expression for the number of composite odd numbers between primes is:

$$D(L) = f(L)^{-1} = \frac{L\ln 2}{2} \approx .347L \quad (22)$$

Number of Composite Odd Integers Between Primes for an Interval $(2^{L-1}, 2^L)$ In order to verify the derived relationship (22), experimental values of prime distances were computed. The experiment was implemented as follows: first a random odd number prime candidate within the interval $(2^{L-1}, 2^L)$ is generated and tested for primality. If composite, the number is continually incremented by two and tested until the nearest prime to the initial random value is found. At this point, a counter is initialized with value 1 and the next successive odd becomes the new prime candidate. This number is also continually incremented by two and tested for primality, with the counter keeping track of the number of odd composites between Successive primes. Each time a prime is found, the counter's value is recorded and then reinitialized for the next iteration.

This experiment was run for several different values of L and furthermore for varying numbers of primes found. The distance was computed as the mean of the individual counter values for each trial. The results were fairly accurate and agreed with the theoretically computed distance within an average accuracy of approximately 13%. Therefore the theoretically derived values for prime density and prime distances are good estimates for the remaining computations in this analysis.

FIG. 1 shows a table diagram at 10 illustrating a comparison between theoretical and calculated distances between primes in intervals of numbers defined for several different cryptographic key length values, and for varying numbers of primes found. Results are shown for trials with L=512, 768, 1024, and 2048 (bits). A percent error is shown for each.

iii. Theoretical and Calculated Variance of Prime Existence from Expected Distance.

The ability to reliably predict the density of primes within an interval is fundamental to more efficient prime generation. As an average of the distances between consecutive primes, the calculated expected distance alone does not provide definitive insight into this analysis, and thus does not provide the needed reliability. The benefit of understanding theoretical prime distances lies in the ability to better predict where the next prime number will be, given a random point within an interval $(2^{L-1}, 2^L)$. However, a mean prime distance does not tell how well ordered the sample of actual distances is. Thus, further investigation is needed to determine the expected variance of the prime gaps.

The theoretical variance can be computed as follows:

Let $\{x_n\}$ represent the sequence of prime candidates that are tested. Let p be the probability that $x_n$ is a prime: $P\{x_n \text{ is prime}\}=p$. Suppose $x_1, x_2, \ldots, x_{t-1}$ are each composite numbers and $x_t$ is the next prime. Let T be the random stopping index when sequencing through $\{x_n\}$. The probability that $x_T$ is the next prime number is:

$$P\{T=t\}=p(1-p)^{t-1}$$

The expected value of T, which is needed for the calculation of the variance, can be expressed in accordance with relationship (23) which is developed by $$E[T] = \sum_{t=1}^{\infty} P\{t=t\} \cdot t \quad (23)$$
$$= \sum_{t=1}^{\infty} p(1-p)^{t-1} \cdot t \left(\text{Note: } \frac{d}{dp}(1-p)^t = -t(1-p)^{t-1}\right)$$
$$= \frac{1}{p}$$

Mean Distribution Between Primes

The variance of T, $\sigma_T^2$, can now be computed in accordance with relationship (24) which is developed as follows:

$$\sigma_T^2 = E[T^2] - E([T])^2 \quad (24)$$
$$= E[(T+1)T] - E[T] - E([T])^2$$
$$= \frac{2}{p^2} - \frac{1}{p} - \frac{1}{p^2}$$
$$= \frac{1-p}{p^2}$$

FIG. 2 shows a table diagram at 12 illustrating experimental versus theoretical variance values for the distance between primes. The illustrated table of values provides a verification for the theoretically derived expression (24) for the variance of T.

iv. Expected Speed Up Ratio: Conventional Prime Number Generation for Two Prime RSA Cryptographic Systems vs. Prime Number Generation in Accordance with the Present Invention for Multi-Prime Cryptographic Systems A major advantage in applying the prime number generation system and method in accordance with the present invention to Multi-Prime cryptographic systems over conventional prime number generation systems for use with conventional two-prime RSA cryptographic systems lies in the ability to vastly decrease the amount of time needed for key generation. As explained above, conventional prime number generation systems rely on at most one exponentiator to perform successive modular exponentiation tests in a sequential manner. As further explained below, the prime number generation system and method in accordance with the present invention provides for the use of a plurality of exponentiators executing in parallel. Since primality testing is the most CPU-intensive step of the encryption process, the ability to execute faster operations in parallel becomes key in measuring the benefits of Multi-Prime.

The expected speed up factor in Multi-Prime's performance over the RSA 2-Prime scheme can be calculated using the expression for prime density described above. First, the performance of key generation for a classic two-prime RSA cryptography system using one exponentiator can be computed as follows:

Two primes, p and q, each of length L bits, need to be generated. The resulting modulus, p·q, has length 2L bits. The total time needed to produce these two keys is:

$$T_{tot} = T_p + T_q$$

For simplicity, represent primality testing using Fermat's Little Theorem. The time associated with performing a Fermat test on a prime candidate of length l bits is on the order of $l^3$. Let t be the time to perform each modular exponentiation of the form:

$$\alpha_i^{p-1} \equiv 1 \pmod{p}, 1 \leq i \leq 4$$

If four of these exponentiations are executed in sequence in accordance with conventional prime number generation techniques, then the time for successful testing of a prime is:

$$T = 4t$$

Since $t \propto L3$, $T \propto 4L^3$

Assume for an unsuccessful prime candidate, failure occurs halfway through Fermat testing, (e.g. i=1, 2). Then $$T \propto 2L^3$$

Now let d(L, 2) represent the distance between primes relative to the odd integers in the range $(2^{L-1}, 2^L)$. If the starting point is a random point between primes, then the expected number of odd composites that will fall Fermat testing before hitting the next prime is:

$$N(L, 2) = \frac{d(L, 2)}{2}$$

Since each unsuccessful test of a prime candidate will take time $T \propto 2L^3$, the total time required for testing each odd composite before prime p is reached is:

$$T_p \propto N(L, 2) \cdot T = N(L, 2) \cdot 2L^3$$
$$= 2L^3 \cdot \frac{d(L, 2)}{2}$$
$$= L^3 \cdot d(L, 2)$$

In the classic RSA 2 prime system, the same time will be needed to test prime q. Therefore, $$T_{tot} = T_p + T_q = 2L^3 \cdot d(L, 2)$$

Key Generation Time for 2 Primes in a Classic RSA System

Next the performance associated with the generation of keys using the MultiPrime System is examined. If 2L is the modulus size in the conventional two prime RSA systems, then each of the k primes using MultiPrime Technology is of length $$\frac{2L}{k}.$$

If $P_k$ denotes one of the of k prime candidates in the MultiPrime system, then the total time needed to produce k keys using parallel exponentiators, as further explained below, is:

$$T'_{tot} = T_{P_k}$$

t'

Again, to estimate the time associated with primality testing, assume Fermat's Little Theorem is used. Let t' denote the time necessary to perform each modular exponentiation of the form:

$$\alpha_i^{Pk-1} \equiv 1 \bmod P_k, 1 \leq i \leq 4$$

If four of these exponentiations are executed in parallel, as further explained below, then time for successful testing of a prime is:

$$T' = t'$$

Since $$t' \propto \left(\frac{2L}{k}\right)^3, T = \left(\frac{2L}{k}\right)^3$$

Assume for an unsuccessful candidate, failure occurs halfway through Fermat testing. (e.g. i=1, 2). If the exponentiations were performed in succession, then the time for each failure would be $$T' \propto 2\left(\frac{2L}{k}\right)^3$$

However, with the exponentiators running in parallel, as further explained below, the total time for each failure is:

$$T' \propto 2\left(\frac{2L}{k}\right)^3$$

Let d(L, k) represent the distance between primes relative to the odd integers in the interval $$\left[2^{\frac{2L}{k}-1}, 2^{\frac{2L}{k}}\right].$$

Starting at a random odd integer in this interval, the expected number of odd composites that will fail Fermat's test before finding the next prime is:

$$N(L, k) = \frac{d(L, k)}{2}$$

Since each unsuccessful candidate will take time $$T' \propto \left(\frac{2L}{k}\right)^3,$$

the total time needed to test each odd composite before reaching prime $P_k$ is:

$$T_{P_t} \propto N(L, k) \cdot T' = N(L, k) \cdot \left(\frac{2L}{k}\right)^3$$
$$= \left(\frac{2L}{k}\right)^3 \cdot \frac{d(L, k)}{2}$$
$$= \frac{4L^3}{k^3} \cdot d(L, k)$$

In the Multi-Prime System, each of the k primes is found while executing exponentiations in parallel as further explained below. Thus, $$T'_{tot} = T_{P_k} = \frac{4L^3}{k^3} \cdot d(L, k)$$

Key Generation Time for k Primes in the MultiPrime System

The expression for the speed up factor (associated with applying the prime number generation method of the present invention to Multi-Prime cryptographic systems over application of conventional prime number generation methods to conventional two-prime cryptographic systems) can be computed as follows:

$$\text{Speed Up} = \frac{T_{tot}}{T'_{tot}} = \frac{2L^3 \cdot d(L, 2)}{\frac{4L^3}{k^3} \cdot d(L, k)} = \frac{k^3 d(L, 2)}{2d(L, k)}$$

Using relationship (22) above, d(L, 2) can be calculated as $$D(L) = \frac{L\ln 2}{2}$$

Similarly, d(L, k) can be calculated as $$D\left(\frac{2L}{k}\right) = \frac{2L\ln 2}{2k} = \frac{L\ln 2}{k}.$$

Substituting both quantities into the Speed Up expression yields relationship (20) below which describes the speed up factor associated with applying the prime number generation method of the present invention to Multi-Prime cryptographic systems over application of conventional prime number generation methods to conventional two-prime cryptographic systems.

$$\text{Speed Up} = \frac{k^3 d(L, k)}{2d(L, 2)} \quad (20)$$
$$= \frac{k^3 \frac{L\ln 2}{2}}{2\frac{L\ln 2}{k}}$$
$$= \frac{k^4}{4}$$

In accordance with relationship (20), the expected speed increase for prime number generation associated with splitting the modulus into k-primes and implementing parallel exponentiation depends only on k, the number of primes found.

FIG. 3 shows a graph at 20 illustrating values of the speed up factor associated with applying the prime number generation method of the present invention to Multi-Prime cryptographic systems over application of conventional prime number generation methods to conventional two-prime cryptographic systems. The values of the speed up factor are plotted along an axis 22 as a function of values of k increasing along an axis 24 from 2 through 10 on a logarithmic scale.

V. The Effects of Pre-Filtering Prime Candidates Using Small Primes

As further explained below, because primality tests such as Fermat's Little Theorem require so much of the available capability of a processing unit, an effort is made to minimize the number of exponentiations performed. One such technique involves testing prime candidates against a list of small prime divisors in order to filter out composites quickly. In order to determine the effectiveness of implementing this pre-filtering technique, an experiment was performed by the Applicants to gather empirical data.

The experiment, extended from the original prime distance algorithm, was conducted as follows: A list is generated of all odd consecutive small prime numbers less than $2^N$ for some N such that $N \geq 8$. Again, a random odd integer is generated within the interval $[2^{L-1}, 2^L]$ and the prime nearest to it is found. Then, a counter is initialized with vale 0. Instead of only using successive iterations of Miller Rabin Primality Testing, this algorithm saves time by eliminating a large portion of composite candidates by determining whether or not they have small prime factors. Thus, when a composite begins testing, the first step is to find the Greatest Common Divisor (GCD) of the candidate and each of the small primes. If any of the GCD's have value greater than 1, then the candidate is immediately known to be composite and no further Miller Rabin testing is necessary. The next successive odd integer is tested the same way, with the counter incremented once with each composite found in this manner. When a candidate is reached which is not relatively prime with all of the small primes, then one iteration of the Miller-Rabin test is performed, and if it is determined to be composite, then the algorithm continues with a new successive candidate using the first technique of computing GCD's with the small primes. This process continues until some candidate passes the Miller Rabin test (and further Miller Rabin tests to achieve a desired confidence level) and is determined to be the next consecutive prime. The essence of this technique is to minimize the number of CPU intensive Miller Rabin tests to as few as possible, only resorting to them when a candidate has no small prime factors.

As mentioned above, prime number generation in accordance with conventional methods is a very time consuming and processing intensive process even in prime number generation systems using an exponentiation unit. This is partially due to the fact that the prime numbers in a predefined interval (e.g., the interval between $2^{L-1}$ and $2^L$) are far apart, and it is therefore necessary to perform probabilistic primality tests on a large number of prime number candidates that are determined to be composite before finding a prime number. However, as described above, it is evident that Multi-prime cryptographic systems allow for faster and more efficient prime number generation because the density of prime numbers is greater in intervals searched for Multi-Prime cryptographic systems than in the intervals searched for classic two-prime cryptographic systems. As an example, assume a modulus n having a length of 1024 bits. In a classic two-prime cryptographic system, each of the factors p and q must have a length of 512 bits. In a Multi-Prime cryptographic system wherein the number of prime factors k=3, each of the factors $p_1$, $p_2$, and $p_3$ must have a length of 341–342 bits. Because the density of primes in the interval ($2^{341-1}$, $2^{341}$) is approximately 1.5 times higher than in the interval ($2^{512-1}$, $2^{512}$), it is faster and more efficient to search for cryptographic keys for use in a Multi-prime cryptographic system than it is to search for cryptographic keys for use in the classic two-prime cryptographic system. However, the present invention provides a system and method for prime number generation that provides improved performance and efficiency in generating cryptographic keys for use in either Multi-prime cryptographic systems or classic two-prime cryptographic systems.

Figures 4, 5:
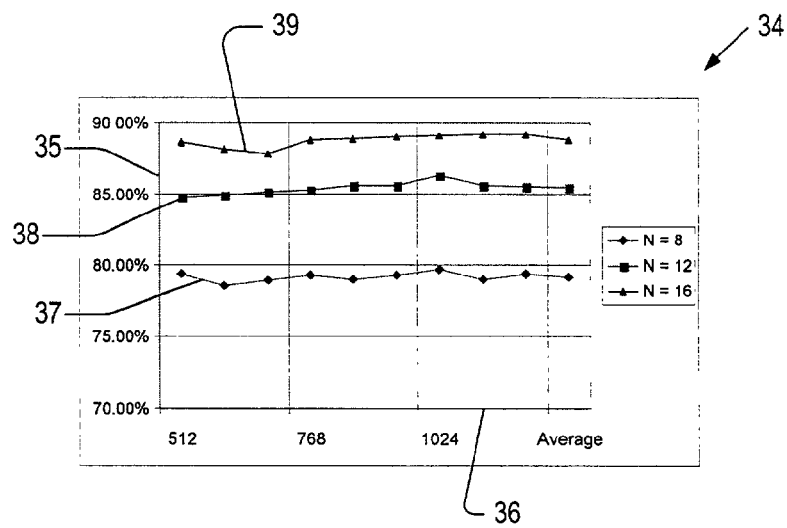
FIG. 4 is a table diagram illustrating average percentages of exponentiations saved due to prefiltering all primes less than $2^N$ for several different cryptographic key length values, and for varying numbers of primes found.
FIG. 5 is a graph illustrating average effectiveness of pre-filtering using as small divisors all primes less than $2^N$.

FIG. 5 shows a graph at 34 illustrating average effectiveness of pre-filtering using all primes less than $2^N$. Values of percentage of exponentiations saved are plotted on a first axis 35 as a function of lengths of primes plotted on a second axis 36. A first curve 37 is fit to plotted values of percentage of exponentiations saved for associated lengths of primes for N=8. A second curve 38 is fit to plotted values of percentage of exponentiations saved for associated lengths of primes for N=12. A third curve 39 is for plotted values of percentage of exponentiations save for associated lengths of primes for N=16.

Figure 6:
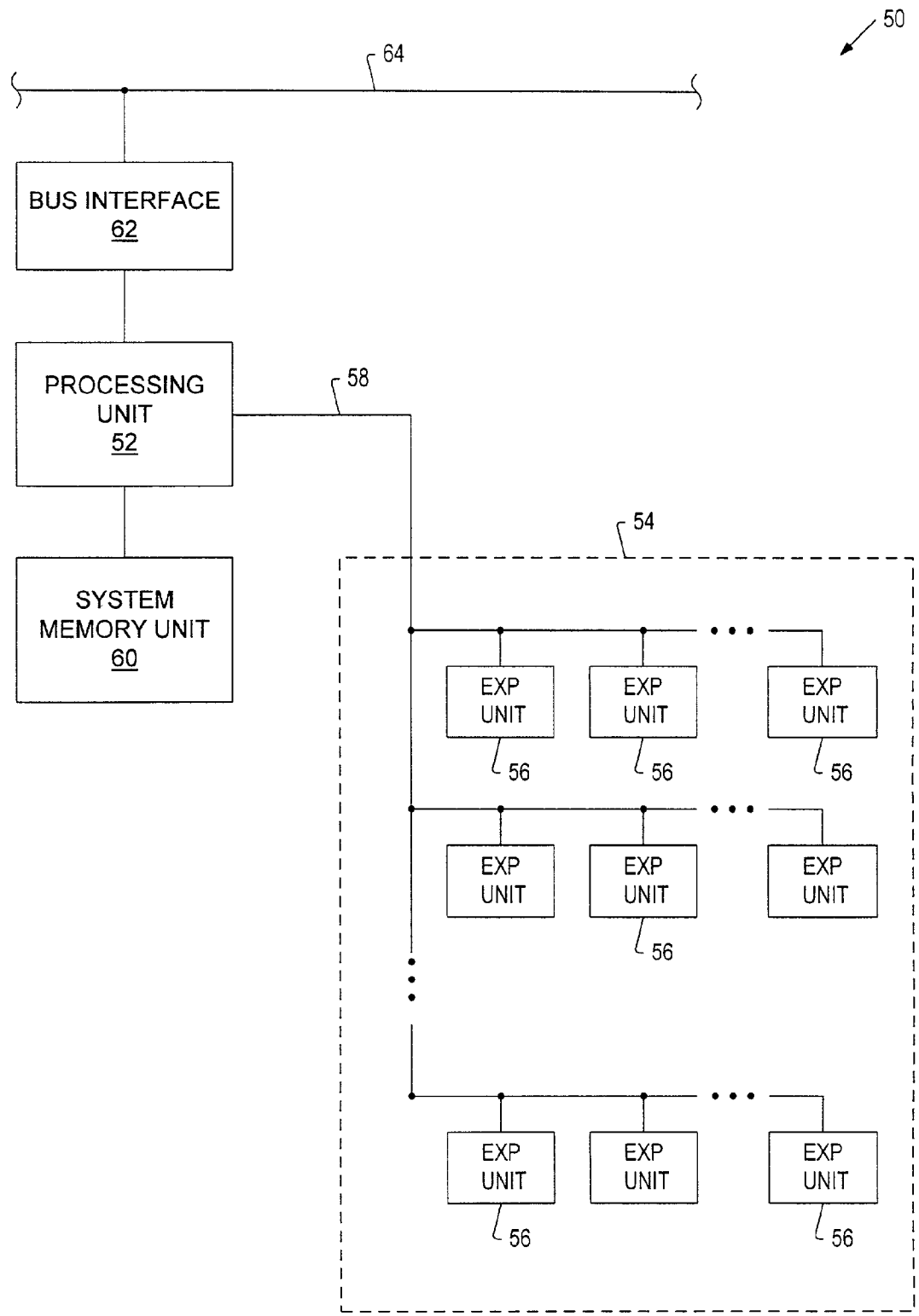
FIG. 6 is a block diagram generally illustrating a prime number generation system in accordance with the present invention, the system including a plurality of exponentiation units for executing a parallel prime number search process.

FIG. 6 shows a block diagram generally illustrating a prime number generation system at 50 in accordance with the present invention. The system includes: a processing unit 52; an array 54 of exponentiation units 56 each being communicatively coupled with the processing unit 52 via an input/output (I/O) bus 58, and being operative to execute exponentiation operations in accordance with a parallel prime number search process of the present invention as further explained below; a system memory unit 60 communicatively coupled with the processing unit 52; and an interface 62 providing an interface between the processing unit 52 and a bus structure 64. The bus structure 64 may be a peripheral component interface (PCI) bus for communicating with a computer system (not shown) such as a personal computer (PC) or a server computing system. In an embodiment, each of the exponentiation units 56 is a state machine controlled arithmetic circuit that is responsive to a set of probabilistic primality test parameters, and operative to perform an exponentiation operation based on the test parameters, and to generate a primality test result signal declaring either "prime" or "composite" as further explained below. In an alternative embodiment, each of the exponentiation units 56 is a processing unit operative to execute instructions for performing an exponentiation operation. In one embodiment, each of the exponentiation units 56 of the array is implemented on a circuit board. In another embodiment, each of the exponentiation units 56 is implemented on a single integrated circuit (IC).

In order to ensure a secure environment, it is preferable that the system 50 meet the Federal Information Protection System (FIPS) 140-1 level 3. Accordingly, the processing unit 52 may be implemented in accordance with a design that is secure from external probing. However, information communicated on the I/O bus 58 between the processing unit 52 and the exponentiation units 56 is exposed. Consequently, to maintain the security, the information communicated on the I/O bus 58 information is first encrypted by a DES unit (not shown) before it is placed on the I/O bus by the processing unit 52. In this embodiment, the exponentiation units 56 also include similar DES units (not shown) to decrypt information received from the processing unit, and later to encrypt information returned to the processing unit.

In operation, the processing unit 52 randomly generates an odd number $n_0$ in a predefined interval (e.g., the interval between $2^{L-1}$ and $2^L$) in accordance with any of a variety of well known random number generating techniques. The randomly generated number $n_0$ provides a first candidate to be tested for primality in accordance with a parallel prime number search process of the present invention. As described above, the probability that the number $n_0$ (randomly generated in the predefined interval between $2^{L-1}$ and $2^L$) is a prime is approximately equal to 1/L. Therefore, as L increases, the probability that the number $n_0$ is a prime decreases.

The array 54 of exponentiation units 56 are used to perform accelerated searching of multiple prime numbers by performing a plurality of exponentiation functions simultaneously and in parallel in accordance with a parallel prime number search process of the present invention. As further explained below, the present invention provides several embodiments of the parallel prime number search process, each embodiment providing for execution of multiple probabilistic primality tests simultaneously and in parallel using selected ones of the array of exponentiation units 56 in order to facilitate accelerated searching of multiple prime numbers.

As mentioned above, if the number $n_0$ is a prime number, then probabilistic primality testing will require the execution of a plurality of t of primality tests, each being performed with respect to an associated base integer α, in order to establish with an acceptable level of certainty that the number is a prime. In accordance with one aspect of the present invention, a number t of the exponentiation units 56 of the array 54 may be used to perform the plurality of t primality tests for determining whether a particular candidate is a prime number. In accordance with the present invention, any suitable primality test may be performed. In one embodiment, the system 50 tests the primality of randomly generated numbers in accordance with the Miller-Rabin primality test. In another embodiment, the system 50 tests for primality by performing t different executions of the Fermat primality test.

As mentioned above, Fermat's theorem asserts that if P is a prime, and α is any integer, $1 \leq \alpha \leq n-1$, then relationship (21), below, is true.

$$\alpha^{P-1} \equiv 1 (\bmod P) \qquad (21)$$

where P is a prime number candidate (e.g., P=$n_0$).

If congruency is not found in accordance with relationship (21), that is if the statement defined by relationship (21) is not true, then $\alpha$ is said to be a Fermat witness to compositeness for n. If n is a composite number, and congruency is found in accordance with relationship (21), then n is said to be a pseudoprime to the base $\alpha$, and the integer $\alpha$ is called a Fermat liar to compositness for n. Because a single probabilistic primality test does not determine primality with certainty, the system 50 tests the primality of randomly generated numbers by performing t different executions of the Fermat probabilistic primality test in accordance with relationship (22) below $$\alpha_1^{P-1} \equiv 1 \bmod P$$

$$\alpha_2^{P-1} \equiv 1 \bmod P$$

.

.

.

$$\alpha_t^{P-1} \equiv 1 \bmod P$$

where P is a prime number candidate (e.g., $P=n_0$).

Each of the exponentiation units 56 is responsive to a set of probabilistic primality test parameters (including an associated base value $\alpha_1, \alpha_2, \ldots \alpha_t$, and a prime number candidate P), and operative to perform an exponentiation operation based on the test parameters, and to generate a primality test result signal declaring either "prime" or "composite". If the prime number candidate P passes all of the congruency tests for $\alpha_1, \alpha_2, \ldots \alpha_t$, then there is no guaranty that the candidate is a prime. However, if the prime number candidate P is a composite number, then it is guaranteed to fail at least one of the congruency tests for $\alpha_1, \alpha_2, \ldots \alpha_t$.

It is noted here that there is a constraint on the prime which may be considered for use in the RSA cryptographic system. This constraint is reflected in the linear congruency of relationship (22), below.

$$e \cdot d \equiv 1 \bmod \phi(n) \quad (22)$$

where $\phi(n)$ is Euler's totient function. Here, d is the private key and is the multiplicative inverse of e mod $\phi(n)$ where e is the public key exponent. The Totient function may be expressed in accordance with relationship (23), below.

$$\phi(n)=(p_1-1)\cdot(p_2-1)\ldots\cdot(p_k-1)(Y) \quad (23)$$

where $n=p_1 \cdot p_2 \cdot \ldots \cdot p_k$.

The linear congruency of relationship (22), above has a unique solution d if and only if GCD(e, $\phi(n)$)=1. That is, e must be relatively prime to $\phi(n)$. This means that e must be a divisor of $(p_1-1)$ or $(p2_1-1) \ldots$ or $(p_k-1)$.

In accordance with a search ahead aspect of the present invention, the processing unit 52 generates an additional number y of odd numbers to serve as prime number candidates $(n_1=n_0+2, n_2=n_0+4, n_3=n_0+6, \ldots n_y=n_0+(y\cdot 2))$ based on the initial randomly generated odd number $n_0$ by successively adding two to the number $n_0$. Exponentiation operations may then be performed in accordance with a first one of the probabilistic primality tests using the base $\alpha_1$ on each of the y+1 candidates $(n_0, n_1, \ldots n_y)$ simultaneously and in parallel using y+1 selected ones of the exponentiation units 56 of the array. As an example, if y=4, each of a set of five prime number candidates $(n_0, n_0+2, n_0+4, n_0+6, n_0+8)$ may be tested in accordance with the first primality test by performing exponentiation operations using the base $\alpha_1$ on each of the candidates simultaneously and in parallel using five selected ones of the exponentiation units 56 of the array.

In another embodiment of the present invention, the search ahead aspect of the present invention may be implemented in searching for k cryptographic key values simultaneously and in parallel. In this embodiment, the processing unit 52 initially generates a plurality of k random odd numbers $n_{0,0}, n_{1,0}, \ldots n_{(k-1),0}$, and then generates an additional number y of odd numbers for each of the random odd numbers $n_{0,0}, n_{1,0}, \ldots n_{(k-1),0}$ by successively adding two to the number $n_0$. This yields a plurality of $(k\times(y+1))$ candidates $(n_{0,1}=n_{0,0}+2, n_{0,2}=n_{0,0}+4, \ldots n_{0,y}=n_{0,0}+(y\cdot 2))$, $(n_{1,1}=n_{1,0}+2, n_{0,2}=n_{1,0}+4, \ldots n_{1,y}=n_{1,0}+(y\cdot 2)), \ldots$ $(n_{(k-1),1}=n_{(k-1),0}+2, n_{(k-1),2}=n_{(k-1),0}+4, \ldots n_{(k-1),y}=n_{(k-1),0}+(y\cdot 2))$ each of which may be subjected to t probabilistic primality tests simultaneously and in parallel using an array of $(k\times t\times(y+1))$ of the exponentiation units 56.

Before execution of probabilistic primality tests on a plurality of prime number candidates, the candidates may be sieved in accordance with one aspect of the present invention by performing a small divisor test on each of the candidates in order to eliminate candidates revealed to be composite numbers by the small divisor test thereby yielding a sieved number y of candidates. The small divisor test includes: (1) predefining a set of small primes (e.g., a set of small primes each being less than $2^8=256$); and (2) dividing each of the candidates by each of the small primes of the predefined set. For each of the candidates, if it is determined that the candidate is divisible by any one of the predefined set of small primes, then it is assumed that the candidate is not a prime. If it is determined that any one of the candidates is not divisible by any of the predefined set of small primes, then the candidate is possibly a prime, and it is necessary to perform further primality testing on the candidate.

As further explained below, in accordance with one embodiment of the present invention, the parallel prime number search process may be executed to search for a plurality of k cryptographic keys $p_1, p_2, \ldots p_k$ simultaneously and in parallel using a plurality of k of the exponentiation units 56. In accordance with this embodiment, the k exponentiation units 56 are used to execute exponentiation operations associated with k probabilistic primality tests, for each of k cryptographic key values, simultaneously and in parallel. In another embodiment of the present invention, an array of $(k\times t)$ of the exponentiation units 56 are used in parallel to simultaneously execute a plurality of t probabilistic primality tests on each of k prime number candidates. In yet another embodiment of the present invention, an array of $(k\times t\times y+1)$ of the exponentiation units 56 are used to simultaneously execute a plurality of t probabilistic primality tests on each of k sets of (y+1) prime number candidates.

In an embodiment of the present invention, the prime number generation system 50 is operative to generate entire sets of cryptographic parameters in response to requests providing specified characteristics for the cryptographic parameters.

Figure 7:
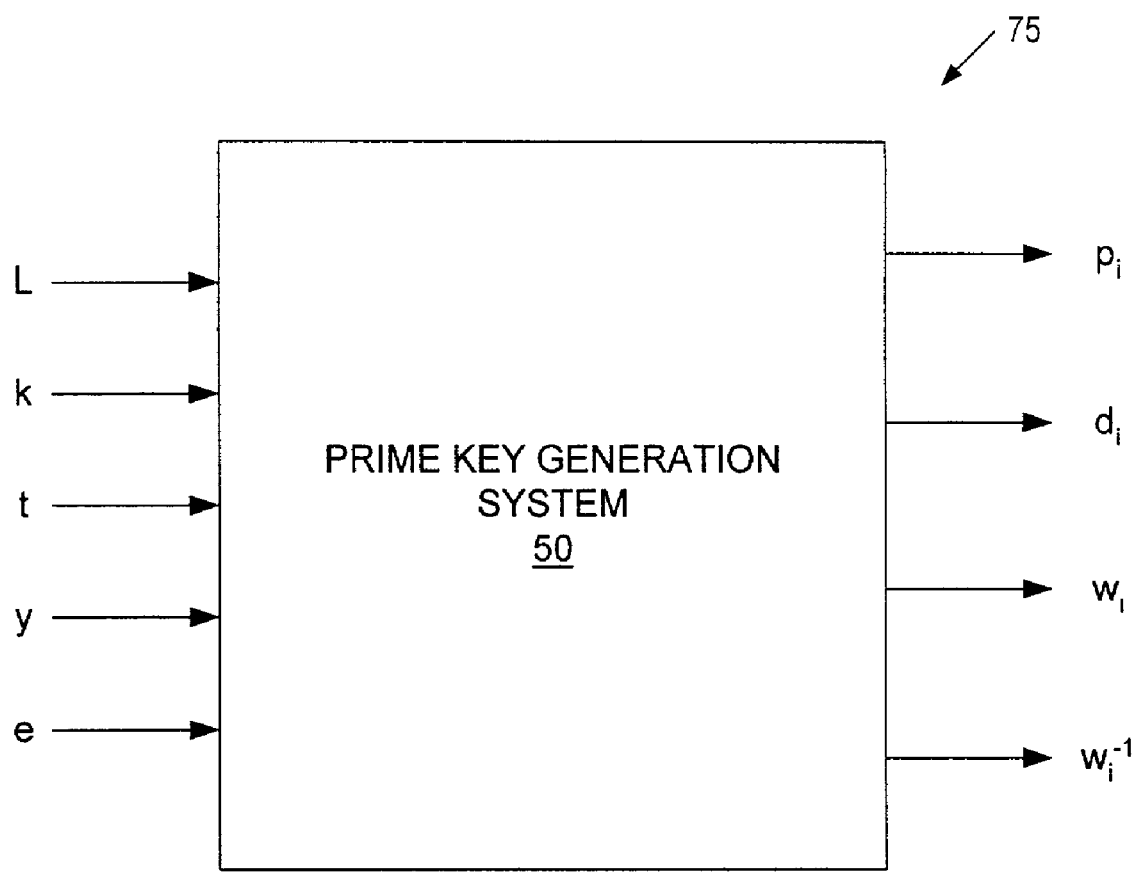
FIG. 7 shows a block diagram generally illustrating input values and output values to and from the prime number generation system of FIG. 6 in accordance with one embodiment of the present invention.

FIG. 7 shows a block diagram at 75 generally illustrating input parameters and output parameters to and from the prime number generation system 50. The input parameters received by the system 50 specify characteristics of cryptographic parameters (including prime number values having specified characteristics) to be generated by the system. The input parameters also specify a particular parallel prime number searching scheme to be executed by the system 50, each scheme requiring a different dynamic allocation of the exponentiations resources of the array 54 (FIG. 6) of exponentiation units. The input parameters include: a length parameter L specifying a length of at least one cryptographic key value to be searched for; a parameter k specifying a number of cryptographic key values to be searched for in parallel based on an associated one of an initial randomly generated number $n_{0,0}, n_{1,0}, \ldots n_{k,0}$; a parameter t specifying a number of exponentiation operations associated with probabilistic primality tests to be executed in parallel; and a parameter y specifying a number of additional candidates to be tested in parallel for each of the initial randomly generated number $n_{0,0}, n_{1,0}, \ldots n_{k,0}$. The specified characteristics further include: a specified public exponent value e; and a parameters CRA_TYPE specifying a type of Chinese Remainder Algorithm to be used by a particular cryptographic application.

Each type of set of cryptographic parameters includes: an associated modulus n having an associated length L and being a composite number generated from the product of an associated number k of randomly generated distinct and suitable prime number values $p_1, p_2, \ldots p_k$, wherein $k \geq 1$; an associated public exponent value e; an associated private exponent value d determined based on the associated prime number values $p_1, p_2, \ldots p_k$ and the associated public exponent value e; a set of sub-task private exponents $d_1, d_2, \ldots d_k$ pre-computed based on the associated prime number values $p_1, p_2, \ldots p_k$ and the associated private key exponent value d in accordance with relationship (17) described above; a first set of Chinese Remainder Algorithm coefficients $W_i$ and $W_i^{-1}$ pre-computed based on the associated prime number values $p_1, p_2, \ldots p_k$ in accordance with relationship (18) described above for the or iterative type of Chinese Remainder Algorithm; and a second set of Chinese Remainder Algorithm coefficients $W_i$ and $W_1^{-1}$ pre-computed based on the associated prime number values $p_1, p_2, \ldots p_k$ in accordance with relationship (19) described above for the summation type of Chinese Remainder Algorithm. As described above, the prime number values $p_1, p_2, \ldots p_k$ must satisfy all of the requirements of being distinct, random, and suitable as stated in accordance with relationships (10) through (15) above.

In a first embodiment of the present invention, the parameters L, k, t, y, e, and CRA_TYPE are predetermined and stored in the system memory unit 60 (FIG. 6) along with computer readable instructions executable by the processing unit 52 (FIG. 6) for implementing a parallel prime number searching process wherein an array of $(k \times t \times (y+1))$ of the exponentiation units 56 (FIG. 6) are used to simultaneously execute a plurality of t probabilistic primality tests on each of k sets of (y+1) prime number candidates to yield cryptographic key values.

In a second embodiment of the present invention, the parameters L, k, t, and y are selected by a user (or specified by a remote computing system that is not shown) and provided to the processing unit via the bus interface 62 (FIG. 6). In this embodiment, computer readable instructions stored in the system memory unit 60 (FIG. 6) and executable by the processing unit, provide for implementing an embodiment of the parallel prime number searching process wherein a user selected array of $(k \times t \times (y+1))$ of the exponentiation units 56 (FIG. 6) are used to simultaneously execute a plurality of t probabilistic primality tests on each of k sets of (y+1) prime number candidates to yield cryptographic key values.

Figure 8:
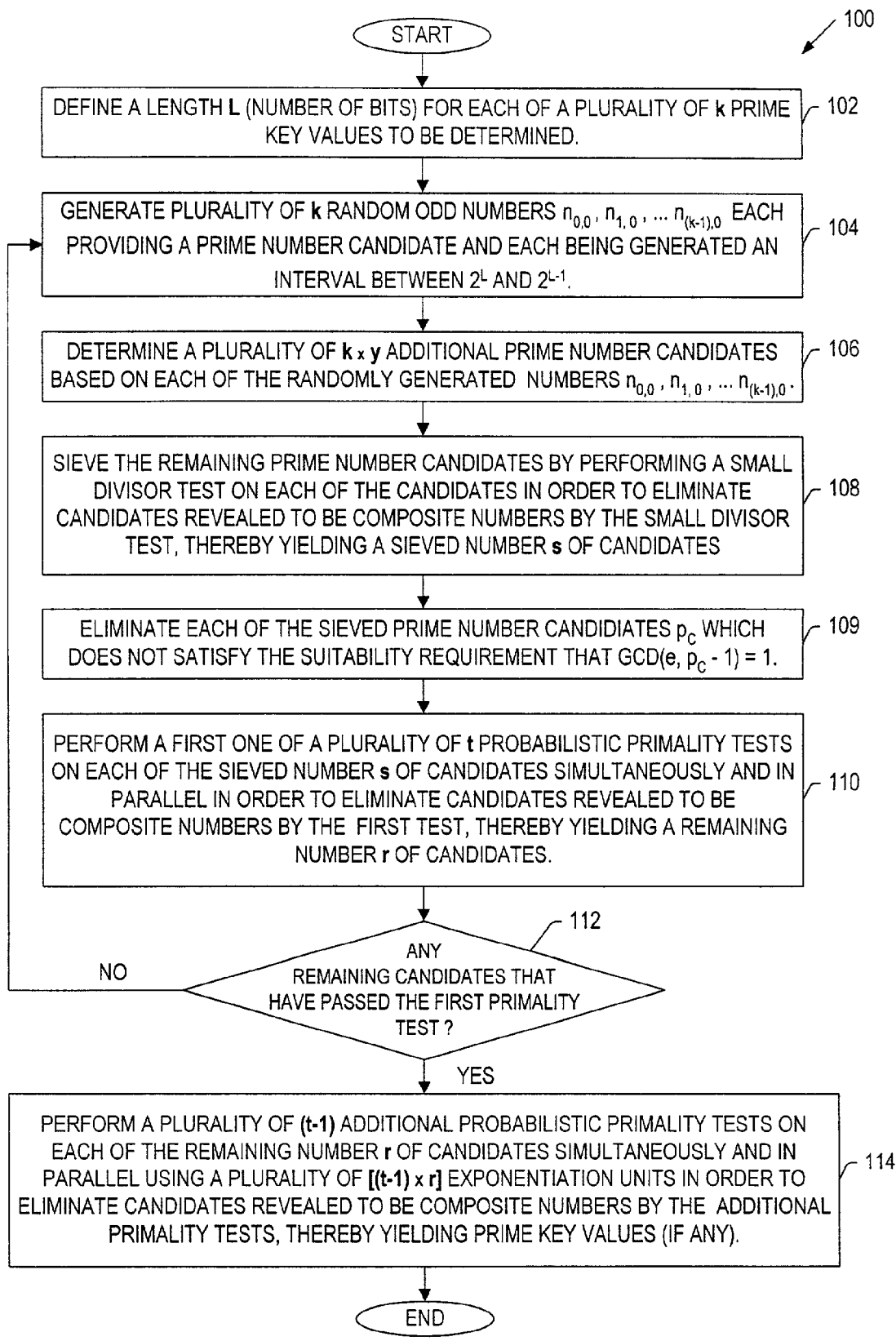
FIG. 8 is a flow diagram generally illustrating a parallel prime number search process performed by the system of FIG. 6 in accordance with a preferred embodiment of the present invention.

FIG. 8 shows a flow diagram illustrating one embodiment of a parallel prime number searching process at 100 performed by the prime number generation system 50 (FIG. 6) in accordance with the present invention. The process 100 begins with a step 102 in which a length parameter L is defined for each of a plurality of k cryptographic key values to be determined. As explained above, the length parameters may be predetermined or selected by a user. In step 104, the processing unit 52 (FIG. 6) of the prime number generation system randomly generates a plurality of k odd numbers $n_{0,0}, n_{1,0}, \ldots n_{(k-1),0}$ each being generated in an interval between $2^L$ and $2^{L-1}$. In step 106, the processing unit determines a plurality of y additional odd numbers based on each of the randomly generated odd numbers $n_{0,0}, n_{1,0}, \ldots n_{(k-1),0}$ to provide $k \times y$ additional prime number candidates $(n_{0,1}=n_{0,0}+2, n_{0,2}=n_{0,0}+4, \ldots n_{0,y}=n_{0,0}+(y \cdot 2))$, $(n_{1,1}=n_{1,0}+2, n_{1,2}=n_{1,0}+4, \ldots n_{1,y}=n_{1,0}+(y \cdot 2))$, $\ldots$ $(n_{(k-1),1}=n_{(k-1),0}+2, n_{(k-1),2}=n_{(k-1),0}+4, \ldots n_{(k-1),y}=n_{(k-1),0}+(y \cdot 2))$. This provides a total number of $(k \times (y+1))$ prime number candidates $(n_{0,0}, n_{0,1}, n_{0,2}, \ldots n_{0,y}), (n_{1,0}, n_{1,1}, n_{1,2}, \ldots n_{1,y}), \ldots (n_{(k-1),0}, n_{(k-1),1}, n_{(k-1),2}, \ldots n_{(k-1),y})$.

In step 108, the processing unit 52 (FIG. 6) of the prime number generation system sieves the prime number candidates determined in step 106 by performing a small divisor test, such as the one described above, on each of the candidates in order to eliminate candidates revealed to be composite numbers by the small divisor test, thereby yielding a sieved number s of prime number candidates.

In step 109, the processing unit 52 (FIG. 6) of the prime number generation system eliminates all prime number candidates $p_c$ which do not satisfy the suitability requirement that GCD $(e, p_c-1)=1$. In accordance with the present invention, performance of the step 109 before probabilistic primality testing is optional. More specifically, step 109 may be performed before primality testing (in steps 110–114 as further explained below) to enhance the parallel prime number searching process particularly if a specified public key exponent e is small because the odds of a prime number candidate being unsuitable (for use in a cryptographic application using a public key exponent e) is approximately equal to 1/e. For example if the public key exponent e=3, then the odds of a prime number candidate being unsuitable are 1 in 3. If the public key exponent e is a large value, then the parallel prime number searching process may be performed more optimally by testing the suitability of each prime number candidate (for use in a cryptographic application using a public key exponent e) after primality testing.

In step 110, the prime number generation system 50 (FIG. 6) performs a first one of a plurality of t probabilistic primality tests on each of the sieved number s of candidates simultaneously and in parallel in order to eliminate candidates revealed to be composite numbers by the first probabilistic primality tests, thereby yielding a remaining number r of candidates. In step 110, a plurality of s of the exponentiation units 56 (FIG. 6) are used to perform a first probabilistic primality test on each of the sieved number s of candidates. In accordance with the present invention, the primality test executed in step 110 may be any type of primality test that includes performing an exponentiation such as, for example, a Miller-Rabin type probabilistic primality test. As another example, the primality test executed in step 110 may be a Fermat type probabilistic primality test using a base $\alpha_1$ in accordance with $$\alpha_1^{P-1} \equiv 1 \bmod P$$

where P is a prime number candidate (e.g., $P=n_{0,0}$).

In step 110, the processing unit 52 (FIG. 6) passes a set of probabilistic primality test parameters (including the first base value $\alpha_1$, and an associated one of the sieved number s of candidates) to each of the plurality of s of the exponentiation units 56 (FIG. 6). Each of the exponentiation units 56 is responsive to the associated set of test parameters, and operative to perform an exponentiation operation based on the test parameters, and to generate a primality test result signal declaring the associated candidate to be either "prime" or "composite". If a prime number candidate P is declared to be composite by the first primality test based on $\alpha_1$, then it is assumed that the candidate is composite. The reason for performing a first primality test on all of the candidates is that is has been observed in experiments conducted by the Applicants that approximately 99% of the candidates are revealed to be composite on the first primality test. Therefore, it is generally unnecessary to perform more than one probabilistic primality test on each of the candidates in order to eliminate it as being composite.

From step 110, the process proceeds to 112 at which it is determined whether there are any remaining ones of the candidates defined in steps 102 through 104 after sieving in step 108 and performing first probabilistic primality tests in step 110. Stated otherwise, it is determined at 112 whether the remaining number of candidates $r \geq 1$. If there are no remaining candidates, the process proceeds back to step 104.

If there is at least one remaining candidate, the process proceeds from 112 to step 114 in which the prime number generation system performs a plurality of (t−1) additional probabilistic primality tests on each of the remaining number r of candidates simultaneously and in parallel using a plurality of ((t−1)×r) selected ones of the exponentiation units 56 (FIG. 6) in order to eliminate candidates revealed to be composite numbers by the additional primality tests, thereby yielding cryptographic key values, if any.

In accordance with the present invention, the primality tests executed in step 114 may be any type of primality tests that include performance of an exponentiation such as, for example, a Miller-Rabin type primality test. As another example, the primality tests executed in step 110 may be Fermat type primality tests using base values $\alpha_2, \alpha_3, \ldots \alpha_t$, in accordance with $$\alpha_2^{P-1} \equiv 1 \bmod P$$

$$\alpha_3^{P-1} \equiv 1 \bmod P$$

$$\alpha_t^{P-1} \equiv 1 \bmod P$$

.
.
.

where P is a prime number candidate (e.g., $P=n_0$).

As noted above, not all prime numbers are suitable for use in cryptographic algorithms like the Multi-Prime RSA Crypto-system. For example, if an odd integer is determined to be a prime number, $n_i = p$, it is possible that this prime p is not acceptable in the Multi-Prime RSA Crypto-system. The prime p must satisfy an additional constraint expressed in accordance with GCD(e, p−1)=1. This constraint requires that the public exponent e and (p−1) be relatively prime. If e and (p−1) have a common divisor greater than 1, then p must be rejected as a key prime. Therefore, the system and method of the present invention also provides for testing to satisfy this constraint.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. In a prime number generating system including a processing unit and a plurality of exponentiation units communicatively coupled with the processing unit, a process of searching for a plurality of prime number values, comprising the steps of:

randomly generating a plurality of k random odd numbers each providing a prime number candidate, including defining a length L for each of the plurality of k random numbers to be generated, and generating each of said plurality of k random odd numbers in an interval between $2^L$ and $2^{L-1}$; and performing a plurality of t primality tests on each of said plurality of k randomly generated prime numbers whereby (k×t) tests are performed in parallel, each of the plurality of (k×t) primality tests including an associated exponentiation operation executed by an associated one of a plurality of (k×t) exponentiation units.

2. In a prime number generating system as recited in claim 1 further comprising the steps of:

sieving said (k×(y+1)) prime number candidates by performing a small divisor test on each of said (k×(y+1)) candidates in order to eliminate candidates revealed to be composite numbers by said small divisor test thereby yielding a sieved number s of candidates;

wherein said step of performing includes performing said plurality of t primality tests on each of said sieved number s of candidates, each of primality tests including an associated exponentiation operation executed by an associated one of a plurality of st of the exponentiation units, said exponentiation operations being performed in parallel by said plurality of st exponentiation units.

3. In a prime number generating system as recited in claim 2 further comprising the steps of:

receiving a specified public exponent e associated with a cryptographic application;

testing the suitable of each of said prime number candidates for use in said cryptographic application by testing the relative primality of a each said prime number candidate ($p_c$) minus one ($p_c-1$) and (b) said specified public exponent e, wherein said step of testing the suitability is performed prior to said step of performing said plurality of primality tests.

4. In a prime number generating system including a processing unit and a plurality of exponentiation units communicatively coupled with the processing unit, a process of searching for a plurality of prime number values, comprising the steps of:

randomly generating a plurality of k random odd numbers each providing a prime number candidate, wherein said plurality of k randomly generated numbers are expressed as $n_{0,0}, n_{1,0} \ldots n_{(k-1),0}$;

determining a plurality of y additional odd numbers based on each one of the randomly generated numbers $n_{0,0}$, $n_{1,0}, \ldots n_{(k-1),0}$ to provide (K×y) additional prime number candidates $(n_{0,1}, n_{0,2}, \ldots n_{0,y}), (n_{1,1}, n_{1,2}, \ldots n_{1,y}), \ldots (n_{(k-1),1}, n_{(k-1),2}, \ldots n_{(k-1),y})$ thereby yielding a total number of (k×(y+1)) prime number candidates; and performing t primality tests on each of said total number of (k×(y+1)) prime number candidates, each of the plurality of (k×(y+1)×t) primality tests including an associated exponentiation operation executed by an associated one of a plurality of (k×(y+1)×t) exponentiation units, said exponentiation operations being performed in parallel by said plurality of (k×(y+1)×t) exponentiation units.

5. In a prime number generating system as recited in claim 4 wherein each of said plurality of prime number values being searched for has a specified length, and wherein said plurality of y additional odd numbers defines an interval that is selected relative to said specified length.

6. In a prime number generating system as recited in claim 4 wherein said step of determining a plurality of y additional odd numbers based on each one of the randomly generated numbers $n_{0,0}, n_{1,0}, \ldots n_{(k-1),0}$ includes successively adding two in each of said randomly generated odd numbers $n_{0,0}, n_{1,0}, \ldots n_{(k-1),0}$ to provide (k×y) additional prime number candidates expressed as $(n_{0,1}=n_{00}+2, n_{0,2}=n_{0,0}+4, \ldots n_{0,y}=n_{0,0}+(y\ 2)), (n_{1,1}=n_{1,0}+2, n_{1,2}=n_{1,0}+4, \ldots n_{1,y}=n_{1,0}+(y\ 2)), \ldots (n_{(k-1),1}=n_{(k-1),0}+2, n_{(k-1),2}=n_{(k-1,0)}+4, \ldots n_{(k-1),y}=n_{(k-1),0}+(y\ 2))$.

7. In a prime number generating system as recited in claim 4 wherein said exponentiation operations are performed by said associated exponentiation units simultaneously.

8. In a prime number generating system as recited in claim 4 further comprising the steps of:
sieving said prime number candidates by performing a small divisor test on each of said number (k×(y×1)) of prime number candidates in order to eliminate candidates revealed to be composite numbers by said small divisor test thereby yielding a sieved number s of candidates;
wherein said step of performing primality tests includes performing t primality tests on each of said sieved number s of candidates, each of the plurality of s×t primality tests including an associated exponentiation operation executed by an associated one of a plurality of s×t exponentiation units, said exponentiation operations being performed in parallel by said plurality of s×t exponentiation units.

9. In a prime number generating system as recited in claim 4 further comprising the step of:
sieving said prime number candidates by performing a small divisor test on each of said number (k×(y+1)) of prime number candidates in order to eliminate candidates revealed to be composite numbers by said small divisor test thereby yielding a sieved number s of candidates;
wherein said step of performing primality tests includes performing an associated first one of t primality tests on each of said sieved number s of candidates, each of the plurality of s first primality tests including an associated exponentiation operation executed by an associated one of a plurality of s of the exponentiation units, said first exponentiation operations being performed by said plurality of s exponentiation units in parallel in order to eliminate candidates revealed to be composite numbers by said first primality tests thereby yielding a remaining number r of candidates; and
performing a plurality of t−1 additional primality tests on each of said remaining number r of candidates, each of the plurality of (r×(t−1)) primality tests including an associated exponentiation operation executed by an associated one of a plurality of (r×(t−1)) exponentiation units, said (r×(t−1)) exponentiation operations being performed by said plurality of (r×(t−1)) exponentiation units in parallel in order to eliminate further candidates revealed to be composite numbers.

10. In a prime number generating system as recited in claim 4 wherein said step of performing primality tests includes performing a Fermat type primality test.

11. In a prime number generating system as recited in claim 4 wherein said step of performing primality tests includes performing a Miller-Rabin type primality test.

12. In a prime number generating system as recited in claim 4 wherein said step of randomly generating a plurality of k random odd numbers further includes:
defining a length L for each of the plurality of k random numbers to be generated; and
generating each of said plurality of k random odd numbers in an interval between $2^L$ and $2^{L-1}$.

13. In a prime number generating system including a processing unit and a plurality of exponentiation units communicatively coupled with the processing unit, a process of searching for a plurality of prime number values, comprising the steps of,
randomly generating at least one random odd number providing a prime number candidate;
determining a plurality of y additional odd numbers based on said at least one randomly generated odd number to provide y additional prime number candidates, thereby providing a total number of y+1 candidates;
performing a plurality t primality tests on each of said (y+1)×t candidates, each of the (y+1)×t primality tests including an associated exponentiation operation executed by an associated one of (y+1)×t exponentiation units, said (y+1)×t exponentiation operations being performed in parallel by said associated (y+1)×t exponentiation units;
and further comprising the step of:
receiving a specified public exponent e associated with a cryptographic application;
testing the suitability of each of said prime number candidates for use in said cryptographic application by testing the relative primality of (a) each of said prime number candidates ($p_c$) minus one ($p_c$−1) and (b) a specified public exponent e, wherein said step of testing the suitability is performed prior to said step of performing said primality tests.

14. In a prime number generating system as recited in claim 13 wherein said at least one randomly generated odd number is expressed as $n_{0,0}$, and wherein said step of determining a plurality of y additional odd numbers based on said randomly generated odd number $n_{0,0}$ includes successively adding two to said randomly generated odd number $n_{0,0}$ to provide y+1 additional prime number candidates expressed as $(n_{0,1}=n_{00}+2, n_{0,2}=n_{0,0}+4, \ldots n_{0,y}=n_{0,0}+(y\ 2))$.

15. In a prime number generating system as recited in claim 13 further comprising the step of sieving said y+1 candidates by performing a small divisor test on each of said candidates in order to eliminate candidates revealed to be composite numbers by said small divisor test thereby yielding a sieved numbers of candidates.

16. In a prime number generating system as recited in claim 13 further comprising the step of:
sieving said y+1 candidates by performing a small divisor test on each of said candidates in order to eliminate candidates revealed to be composite numbers by said small divisor test thereby yielding a sieved number s of candidates;
wherein said step of performing primality tests includes performing an associated first one of t primality tests on each of said sieved numbers of candidates, each of the plurality of s first primality tests including an associated exponentiation operation executed by an associated one of a plurality of s of the exponentiation units, said first exponentiation operations being performed by said plurality of s exponentiation units in parallel in order to eliminate candidates revealed to be composite numbers by said first primality tests thereby yielding a remaining number r of candidates; and performing a plurality of t–1 additional primality tests on each of said remaining number r of candidates, each of the plurality of (r×(t–1)) additional primality tests including an associated exponentiation operation executed by an associated one of a plurality of (r×(t–1)) exponentiation units, the (r×(t–1)) exponentiation operations being performed by said plurality of (r×(t–1)) exponentiation units in parallel in order to eliminate further candidates revealed to be composite numbers.

17. In a prime number generating system as recited in claim 13 wherein said step of performing primality tests includes performing a Fermat type primality test.

18. In a prime number generating system as recited in claim 13 wherein said step of performing primality tests includes performing a Miller-Rabin type primality test.

19. In a prime number generating system as recited in claim 13 wherein said step of randomly generating at least one random odd number further includes:

defining a length L for the or each of the odd numbers to be generated; and generating the or each of said plurality of odd numbers in an interval between $2^L$ and $2^{L-1}$.

20. In a prime number generating system including a processing unit and a plurality of exponentiation units communicatively coupled with the processing unit, a process of searching for a plurality of prime number values, comprising the steps of:

randomly generating a plurality of random odd numbers providing prime number candidates;

sieving said candidates by performing a small divisor test on each of said candidates in order to eliminate candidates revealed to be composite numbers by said small divisor test thereby yielding a sieved number s of candidates;

testing the pimality of said sieved candidates by performing a first one of a plurality of t primality tests on said sieved number s of candidates, each of the plurality s of the first primality tests including an associated exponentiation operation executed by an associated one of a plurality s of the exponentiation units, said exponentiation operations being performed simultaneously by said plurality of s exponentiation units in order to eliminate candidates revealed to be composite numbers thereby yielding a remaining number r of candidates; and performing a plurality of t–1 additional ones of said t primality tests on each of said remaining number r of candidates, each of the plurality of (r×(t–1)) first primality tests including an associated exponentiation operation executed by an associated one of a plurality of (r×(t–1)) exponentiabon units, said (r×(t–1)) exponentiation operations being simultaneously performed by said plurality of (r×(t–1)) exponentiation units in order to eliminate further candidates revealed to be composite numbers.

21. In a prime number generating system as recited in claim 20 further including the steps of:

receiving a specified public exponent e associated with a cryptographic application; and testing the suitability of each of said prime number candidates for use in said cryptographic application by testing the relative primality of (a) each said prime number candidates ($p_c$) minus one ($p_c-1$) and (b) said specified public exponent e, wherein said step of testing the suitability is performed prior to said step of performing said first one of said primality tests.

22. In a prime number generating system including a processing unit and a plurality of exponentiation units communicatively coupled with the processing unit, a process of searching for a plurality of prime number values, comprising the steps of:

randomly generating a plurality of k random odd numbers expressed as $n_{0,0}, n_{1,0}, \ldots n_{(k-1),0}$, each said number providing a prime number candidate;

determining a plurality of y additional odd numbers based on each one of the randomly generated odd numbers $n_{1,0}, \ldots n_{(k-1),0}$, to provide (k×y) additional prime number candidates ($n_{0,1}, n_{0,2}, \ldots n_{0,y}$), ($n_{1,1}, n_{1,2}, \ldots n_{1,y}$), $\ldots$ ($n_{(k-1),1}, n_{(k-1),y}$) thereby yielding a total number of (k×(y+1)) prime number candidates;

sieving said (k×(y+1)) prime number candidates by performing a small divisor test on each of said candidates in order to eliminate candidates revealed to be composite numbers by said small divisor test thereby yielding a sieved number s of candidates; and performing at least one primality test on each of said sieved number s of candidates, each of the plurality of s primality tests including an associated exponentiation operation executed by an associated one of a plurality of s of the exponentiation units, said exponentiation operations being performed in parallel by said plurality of s exponentiation units in order to eliminate candidates revealed to be composite numbers by said primality test thereby yielding a remaining number r of candidates; and performing a plurality of t–1 additional primality tests on each of said remaining number r of candidates, each of the plurality of (r×(t–1)) primality tests including an associated exponentiation operation executed by an associated one of a plurality of (r×(t–1)) exponentiation units, said (r×(t–1)) exponentiation operations being performed by in parallel by said plurality of (r×(t–1)) exponentiation units in order to eliminate further candidates revealed to be composite numbers.

23. In a prime number generating system as recited in claim 22 wherein said step of determining a plurality of y additional odd numbers based on each one of the randomly generated odd numbers $n_{1,0}, \ldots n_{(k-1),0}$ includes successively adding two to each of said randomly generated odd numbers $n_{1,0}, \ldots n_{(k-1),0}$ to provide (k×y) additional prime number candidates expressed as ($n_{0,1}=n_{00}+2, n_{0,2}=n_{0,0}+4, \ldots n_{0,y}+(y\ 2)$), ($n_{1,1}=n_{1,0}+2, n_{1,2}=n_{1,0}+4, \ldots n_{1,y}=n_{1,0}+(y\ 2)$), $\ldots$ ($n_{(k-1),1}=n_{(k-1),0}+2, n_{(k-1),2}=n_{(k-1),0}+4, \ldots n_{(k-1),y}=n_{(k-1),0}+(y\ 2)$).

24. In a prime number generating system as recited in claim 22 wherein said step of performing said first primality test includes performing a Fermat type primality test.

25. In a prime number generating system as recited in claim 22 wherein said step of performing said first primality test includes performing a Miller-Rabin type primality test.

26. In a prime number generating system as recited in claim 22 wherein said step of randomly generating a plurality of k random odd numbers further includes:

defining a length L for each of the plurality of k random numbers to be generated; and generating each of said plurality of k random odd numbers in an interval between $2^L$ and $2^{L-1}$.

27. In a prime number generating system as recited in claim 22 wherein k is greater than or equal to 2.

28. In a prime number generating system as recited in claim 22 further comprising the steps of:
   receiving a specified public exponent e associated with a cryptographic application;
   testing the suitability of each of said sieved prime number candidates for use in said cryptographic application by testing the relative primality of (a) each said sieved prime number candidate ($p_c$) minus one ($p_c-1$) and (b) said specified public exponent e, wherein said step of testing the suitability is performed prior to said step of performing said first primality tests.

29. A prime number generating system for searching for a plurality of prime number values, comprising:
   processing means operative to randomly generate a plurality of k random odd numbers each providing a prime number candidate, and to provide a plurality t sets of test parameters associated with a plurality of t primality tests to be performed on each one of said plurality of k randomly generated numbers, each (k×t) sets of said test parameters including said associated one of said plurality k randomly generated numbers and an associated one of a plurality of t base values; and
   a plurality of exponentiation units each being communicatively coupled with said processing means, said plurality of exponentiation units includes a plurality of at least (k×t) exponentiation units each being responsive to an associated one of said (k×t) sets of test parameters, and operative to perform an exponentiation operation based on said associated set of test parameters, and also operative to generate a primality test result signal declaring said associated prime number candidate to be either composite or prime with reference to said associated base value, said exponentiation units being operative to perform said plurality of at least (k×t) exponentiation operations in parallel;
   said processing means being responsive to said primality test result signals, and operative to process said test result signals for the purpose of eliminating randomly generated numbers declared to be composite in accordance with a search for prime number values.

30. A prime number generating system as recited in claim 29 wherein said processing means is further operative to sieve said prime number candidates by performing a small divisor test on each of said prime number candidates in order to eliminate candidates revealed to be composite numbers by said small divisor test thereby yielding a sieved number s of candidates.

31. A prime number generating system as recited in claim 29 wherein said plurality of k randomly generated odd numbers are expressed as $n_{0,0}, n_{1,0}, \ldots n_{(k-1),0}$, and wherein:
   said processing means is further operative to develop a plurality of y additional odd numbers based on each one of the randomly generated odd numbers $n_{0,0}$, $n_{1,0}, \ldots n_{(k-1),0}$, to provide (k×y) additional prime number candidates $(n_{0,1}, n_{0,2}, \ldots n_{0,y}), (n_{1,1}, n_{1,2}, \ldots n_{1,y}), \ldots (n_{(k-1),1}, n_{(k-1),2}, \ldots n_{(k-1),y})$ thereby yielding a total number of (k×(y+1)) prime number candidates;
   said plurality of exponentiation units includes a plurality of at least (k×(y+1)) exponentiation units each being responsive to an associated one of said (k×(y+1)) sets of said test parameters, and being operative to perform an exponentiation operation based on said associated set of test parameters, and also operative to generate a primality test result signal declaring said associated prime number candidate to be either composite or prime with reference to said associated base value, said plurality of at least (k×(y+1)) exponentiation units being operative to perform the plurality of (k×(y+1)) exponentiation operations in parallel.

32. A prime number generating system as recited in claim 31 wherein said processing means is operative to develop said plurality of y additional odd numbers based on each one of the randomly generated odd numbers $n_{1,0}, \ldots n_{(k-1),0}$, by successively adding two to each of said randomly generated odd numbers $n_{1,0}, \ldots n_{(k-1),0}$, to provide (k×y) additional prime number candidates expressed as $(n_{0,1}=n_{0,0}+2, n_{0,2}=n_{0,0}+4, \ldots n_{0,y}=n_{0,1}+(y\ 2)), (n_{1,1}=n_{1,0}+2, n_{1,2}=n_{1,0}+4, \ldots n_{1,y}=n_{1,0}+(y\ 2)), \ldots n_{(k-1),1}=n_{(k-1),0}+2, n_{(k-1),2}=n_{(k-1),0}+4, \ldots n_{(k-1),y}=n_{(k-1),0}+(y\ 2))$.

33. A prime number generating system as recited in claim 31 wherein:
   said processing means is operative to provide a plurality of t sets of test parameters associated with a plurality of t primality tests to be performed on each one of said plurality of (k×(y+1)) randomly generated numbers, each of the (k×(y+1)×t) sets of said test parameters including said associated one of said plurality of (k×(y+1)) prime number candidates and an associated one of a plurality of t base values;
   said plurality of exponentiation units includes a plurality of at least (k×(y+1)×t) exponentiation units each being responsive to an associated one of said (k×(y+1)×t) sets of said test parameters, and being operative to perform an exponentiation operation based on said associated set of test parameters, and also operative to generate a primality test result signal declaring said associated prime number candidate to be either composite or prime with reference to said associated base value, said plurality of at least (k×(y+1)×t) exponentiation units being operative to perform said plurality of (k×(y+1)×t) exponentiation operations in parallel.

34. A prime number generating system as recited in claim 29 wherein each of said primality tests is a Fermat type primality test.

35. A prime number generating system as recited in claim 29 wherein each of said primality tests is a Miller-Rabin type primality test.

36. A prime number generating system as recited in claim 29 wherein said processing means is operative to randomly generate said plurality of k random odd numbers by performing the steps of:
   defining a length L for each of the plurality of k random numbers to be generated; and
   generating each of said plurality of k random odd numbers in an interval between $2^L$ and $2^{L-1}$.

37. A prime number generating system for searching for a plurality of prime number values, comprising:
   processing means operative to randomly generate at least one random odd number providing a prime number candidate, and to determine a plurality of y additional odd numbers based on each of said at least one randomly generated odd number to provide y additional prime number candidates, thereby providing a total number of y+1 candidates, said processing means also operative to provide a plurality of t sets of test parameters associated with a plurality t primality tests to be performed on each one of said y+1 prime number candidates, each of the ((y+1(×t) sets of test parameters including said associated one of said plurality of prime number candidates and an associated base value; and
   a plurality of at least ((y+1)×t) exponentiation units each communicatively coupled with said processing means, and each responsive to an associated one of said $((y+1) \times t)$ sets of test parameters, and operative to perform an ecponentiation operation based on said associated set of test parameters, and also operative to generate a primality test result signal declaring said associated prime number candidate to be either composite or prime with reference to said associated base value, said plurality of at least $((y+1) \times t)$ exponentiation units being operative in parallel to perform said plurality of $((y+1) \times t)$ exponentiation;

said processing means being responsive to said primality test result signals, and operative to process said test result signals for the purpose of eliminating randomly generated numbers declared to be composite in accordance with a search for prime number values.

38. A prime number generating system as recited in claim 37 wherein said at least one randomly generated odd number is expressed as $n_{0,0}$, and wherein said processing means is operative to determine said plurality of y additional odd numbers based on said randomly generated odd number by successively adding two to said randomly generated odd number $n_{0,0}$ to provide $(y+1)$ additional prime number candidates expressed as $(n_{0,1}=n_{00}+2, n_{0,0}+4, \ldots n_{0,y}=n_{0,0}+(y\ 2))$.

39. A prime number generating system as recited in claim 37 wherein said processing means is further operative to sieve said prime number candidates by performing a small divisor test on each of said prime number candidates in order to eliminate candidates revealed to be composite numbers by said small divisor test thereby yielding a sieved number s of candidates.

40. A prime number generating system as recited in claim 37 wherein:

said processing means is operative to generate a plurality of k random odd numbers each providing a prime number candidate, and to determine a plurality of y additional odd numbers based on each of said k random odd numbers to provide k×y additional prime number candidates, thereby providing a total number of at least $k \times (y+1)$ candidates, said processing means also operative to provide t sets of test parameters associated with t primality tests to be performed on each one of said $k \times (y+1)$ prime number candidates, each said set of said test parameters including said associated prime number candidate and an associated base value; and said plurality of exponentiation units includes a plurality of at least $(k \times (y+1) \times t)$ exponentiation units each being responsive to an associated one of said $(k \times (y+1) \times t)$ sets of said test parameters, and being operative to perform an exponentiation operation based on said associated set of test parameters, and also operative to generate a primality test result signal declaring said associated prime number candidate to be either composite or prime with reference to said associated base value, said plurality of at least $(k \times (y+1) \times t)$ exponentiation units being operative to perform said plurality of $(k \times (y+1) \times t)$ exponentiation operations in parallel.

41. A prime number generating system as recited in claim 40 wherein said processing means is operative to randomly generate said plurality of k random odd numbers by performing the steps of:

defining a length L for each of the plurality of k random numbers to be generated; and generating each of said plurality of k random odd numbers in an interval between $2^L$ and $2^{L-1}$.

42. A prime number generating system as recited in claim 37 wherein each of said primality tests is a Fermat type primality test.

43. A prime number generating system as recited in claim 37 wherein each of said primality tests is a Miller-Rabin type primality test.

44. A computer readable storage medium having stored thereon encoding instructions for executing a process of searching for a plurality of prime number values in a prime number generation system including a processing unit and a plurality of exponentiation units communicatively coupled with the processing unit, the process comprising the steps of:

randomly generating a plurality of k random odd numbers each providing a prime number candidate, said plurality of k randomly generated numbers are expressed as $n_{0,0}, n_{1,0}, \ldots n_{(k-1),0}$;

determining a plurality of y additional odd numbers based on each one of the randomly generated numbers $n_{0,0}, n_{1,0}, \ldots n_{(k-1),0}$ to provide $(k \times y)$ additional prime number candidates $(n_{0,1}, n_{0,2}, \ldots n_{0,y}), (n_{1,1}, n_{1,2}, \ldots n_{1,y}), \ldots (n_{(k-1),1}, n_{(k-1),2}, \ldots n_{(k-1),y})$ thereby yielding a total number of $(k \times (y+1))$ prime number candidates; and performing a plurality of t primality tests on each of said total number of $(k \times (y+1))$ prime numbers whereby $(k \times (y+1) \times t)$ tests are performed in parallel, each of the plurality of $(k \times (y+1) \times t)$ primality tests including an associated exponentiation operation executed by an associated one of a plurality of $(k \times x(y+1) \times t)$ exponentiation units.

45. A computer readable storage medium as recited in claim 44 wherein said step of determining a plurality of y additional odd numbers based on each one of the randomly generated numbers $n_{0,0}, n_{1,0}, \ldots n_{(k-1),0}$ includes successively adding two to each of said randomly generated odd numbers $n_{0,0}, n_{1,0}, \ldots n_{(k-1),0}$ to provide $(k \times y)$ additional prime number candidates expressed as $(n_{0,1}=n_{0,0}+2, n_{0,2}=n_{0,0}+4, \ldots n_{0,y}=n_{0,0}+(y\ 2)), (n_{1,1}=n_{1,0}+2, n_{1,2}=n_{1,0}+4, \ldots n_{1,y}=n_{1,0}+(y\ 2)), \ldots (n_{(k-1),1}=n_{(k-1),0}+2, n_{(k-1),2}=n_{(k-1,0)}+4, \ldots n_{(k-1),y}=n_{(k-1),0}+(y\ 2))$.

46. A computer readable storage medium as recited in claim 44 further comprising the steps of:

sieving said prime number candidates by performing a small divisor test on each of said number $(k \times (y+1))$ of prime number candidates in order to eliminate candidates revealed to be composite numbers by said small divisor test thereby yielding a sieved number s of candidates;

wherein said step of performing includes performing t primality tests on each of said sieved number s of candidates, each of the plurality of s×t primality tests including an associated exponentiation operation executed by an associated one of a plurality of s×t exponentiation units, said exponentiation operations being performed by said plurality of s×t exponentiation units simultaneously.

47. A computer readable storage medium as recited in claim 46 further comprising the steps of:

receiving a specified public exponent e associated with a cryptographic application;

testing the suitability of each of said prime number candidates for use in said cryptographic application by testing the relative primality of (a) each said prime number candidate ($p_c$) minus one ($p_c-1$) said specified public exponent e, wherein said step of testing the suitability as performed prior to said step of performing said primality tests.

48. A computer readable storage medium as recited in claim 44 further comprising the steps of:
  sieving said prime number candidates by performing a small divisor test on each of said number (k×(y+1)) of prime number candidates in order to eliminate candidates revealed to be composite numbers by said small divisor test thereby yielding a sieved number s of candidates;
  wherein said step of performing includes performing an associated first one of t primality tests on each of said sieved numbers of candidates, each of the plurality of s first primality tests including an associated exponentiation operation executed by an associated one of a plurality of s of the exponentiation units, said first exponentiation operations being performed by said plurality of s exponentiation units in parallel in order to eliminate candidates revealed to be composite numbers by said first primality tests thereby yielding a remaining number r of candidates; and
  performing a plurality of t−1 additional primality tests on each of said remaining number r of candidates, each of the plurality of (r×(t−1)) primality tests including an associated exponentiation operation executed by an associated one of a plurality of (r×(t−1)) exponentiation units, said (r×(t−1)) exponentiation operations being performed by said plurality of (r×(t−1)) exponentiation units in parallel in order to eliminate further candidates revealed to be composite numbers.

49. In a prime number generating system including a processing unit and a plurality of exponentiation units communicatively coupled with the processing unit, a process of searching for a plurality of prime number values, comprising the steps of:
  randomly generating a plurality of random odd numbers each providing a prime number candidate; and
  receiving a specified public exponent e associated with a cryptographic application;
  testing the suitability of each of said prime number candidates for use in said cryptographic application by testing the relative primality of (a) each said prime number candidate ($p_c$) minus one ($p_c-1$) and (b) said specified public exponent e to yield a plurality of k suitable prime number candidates; and
  performing a plurality of t primality tests on each of said plurality of k suitable prime number candidates whereby (k×t) tests are performed in parallel, each of the plurality of (k×t) primality tests including an associated exponentiation operation executed by an associated one of a plurality of (k×t) exponentiation units.

50. In a prime number generating system including a processing unit and a plurality of exponentiation units communicatively coupled with the processing unit, a process of searching for a plurality of prime number values, comprising the steps of:
  randomly generating a plurality of k random odd numbers expressed as $n_{0,0}, n_{1,0}, \ldots n_{(k-1),0}$, each said number providing a prime number candidate;
  determining a plurality of y additional odd numbers based on each one of the randomly generated odd numbers $n_{1,0}, \ldots n_{(k-1),0}$ to provide (k×y) additional prime number candidates $(n_{0,1}, n_{0,2}, \ldots n_{0,y}), (n_{1,1}, n_{1,2}, \ldots n_{1,y}), \ldots n_{(k-1),1}, n_{(k-1),2}, \ldots n_{(k-1),y})$ thereby yielding a total number of (k×(y+1)) prime number candidates;
  sieving said (k×(y+1)) prime number candidates by performing a small divisor test on each of said candidates in order to eliminate candidates revealed to be composite numbers by said small divisor test thereby yielding a sieved number of candidates;
  receiving a specified public exponent e associated with a cryptographic application;
  testing the suitability of each of said sieved prime number candidates for use in said cryptographic application by testing the relative primality of (a) each said sieved prime number candidate ($p_c$) minus one ($p_c-1$) and (b) said specified public exponent e to yield s suitable sieved candidates; and
  performing at least one primality test on each of said s suitable sieved candidates, each of the plurality of s primality tests including an associated exponentiation operation executed by an associated one of a plurality of s exponentiation units, said exponentiation operations being performed in parallel by said plurality of s exponentiation units in order to eliminate candidates revealed to be composite numbers by said primality test thereby yielding a remaining number r of candidates.

51. In a prime number generating system as recited in claim 50 further comprising the steps of:
  performing a plurality of t−1 additional primality tests on each of said remaining number r of candidates, each of the plurality of (r×(t−1)) primality tests including an associated exponentiation operation executed by an associated one of a plurality of (r×(t−1)) exponentiation units, said (r×(t−1)) exponentiation operations being performed by in parallel by said plurality of (r×(t−1)) exponentiation units in order to eliminate further candidates revealed to be composite numbers.

* * * * *

UNITED STATES PATENT AND TRADEMARK OFFICE
CERTIFICATE OF CORRECTION

PATENT NO. : 7,120,248 B2
APPLICATION NO. : 09/818914
DATED : October 10, 2006
INVENTOR(S) : W. Dale Hopkins et al.

It is certified that error appears in the above-identified patent and that said Letters Patent is hereby corrected as shown below:

In column 14, line 15, delete "(2L-1, $2^L$)" and insert -- ($2^{L-1}$, $2^L$) --, therefor.

In column 23, line 30, delete "$W_i$ and $W_1^{-1}$" insert -- $W_1$ and $W_i^{-1}$ --, therefor.

In column 26, line 40, in Claim 3, delete "suitable" and insert -- suitability --, therefor.

In column 26, line 42, in Claim 3, delete "a" and insert -- (a) --, therefor.

In column 26, line 55, in Claim 4, delete "$n_{(k-1)),0}$" and insert -- $n_{(k-1),0}$ --, therefor.

In column 26, line 58, in Claim 4, delete "(K×y)" and insert -- (k×y) --, therefor.

In column 27, line 13, in Claim 6, delete "in" and insert -- to --, therefor.

In column 27, line 15, in Claim 6, delete "$n_{00}+2$" and insert -- $n_{0,\,0}+2$ --, therefor.

In column 27, lines 16, in Claim 6, delete "(y 2))" and insert -- (y·2)) --, therefor.

In column 27, lines 16-17, in Claim 6, delete "(y 2))" and insert -- (y·2)) --, therefor.

In column 27, line 17, in Claim 6, delete "$n_{(k-1,0}$" and insert -- $n_{(k-1),0}$ --, therefor.

In column 27, line 18, in Claim 6, delete "(y 2))" and insert -- (y·2)) --, therefor.

In column 27, line 26, in Claim 8, delete "(k×(y×l))" and insert -- (k×(y+l)) --, therefor.

In column 28, line 18, in Claim 13, delete "of," and insert -- of: --, therefor.

In column 28, line 49, in Claim 14, delete "$n_{00}+2$" and insert -- $n_{0,\,0}+2$ --, therefor.

In column 28, line 49, in Claim 14, delete "(y 2))" and insert -- (y·2)) --, therefor.

In column 28, line 65, in Claim 16, delete "numbers" and insert -- number s --, therefor.

In column 29, line 41, in Claim 20, delete "pimality" and insert -- primality --, therefor.

UNITED STATES PATENT AND TRADEMARK OFFICE
CERTIFICATE OF CORRECTION

PATENT NO.        : 7,120,248 B2
APPLICATION NO. : 09/818914
DATED             : October 10, 2006
INVENTOR(S)       : W. Dale Hopkins et al.

It is certified that error appears in the above-identified patent and that said Letters Patent is hereby corrected as shown below:

In column 29, line 57, in Claim 20, delete "exponentiabon" and insert -- exponentiation --, therefor.

In column 30, line 17, in Claim 22, delete "$n_{0,2}$" and insert -- $n_{0,2}$, --, therefor.

In column 30, line 18, in Claim 22, after "$n_{(k-1),1}$," insert -- $n_{(k-1),2},\ldots$ --.

In column 30, line 47, in Claim 23, insert -- $n_{0,0}$, -- before "$n_{1,0}$,".

In column 30, line 49, in Claim 23, insert -- $n_{0,0}$, -- before "$n_{1,0}$,".

In column 30, line 51, in Claim 23, delete "$n_{00}+2$" and insert -- $n_{0,0}+2$ --, therefor.

In column 30, line 52, in Claim 23, delete "(y 2))" and insert -- (y·2)) --, therefor.

In column 30, lines 52-53, in Claim 23, delete "(y 2))" and insert -- (y·2)) --, therefor.

In column 30, line 53, in Claim 23, delete "$n_{(k-1,0}$" and insert -- $n_{(k-1),0}$ --, therefor.

In column 30, line 54, in Claim 23, delete "(y 2))" and insert -- (y·2)) --, therefor.

In column 32, line 8, in Claim 32, insert -- $n_{0,0}$, -- before "$n_{1,0}$,".

In column 32, line 10, in Claim 32, insert -- $n_{0,0}$, -- before "$n_{1,0}$,".

In column 32, line 11, in Claim 32, delete "$n_{00}+2$" and insert -- $n_{0,0}+2$ --, therefor.

In column 32, line 12, in Claim 32, delete "(y 2))" and insert -- (y·2)) --, therefor.

In column 32, line 13, in Claim 32, delete "(y 2))" and insert -- (y·2)) --, therefor.

In column 32, line 13, in Claim 32, delete "$n_{(k-1),1}$" and insert -- $(n_{(k-1),1}$ --, therefor.

In column 32, line 13, in Claim 32, delete "$n_{(k-1,0}$" and insert -- $n_{(k-1),0}$ --, therefor.

In column 32, line 14, in Claim 32, delete "(y 2))" and insert -- (y·2)) --, therefor.

In column 32, line 63, in Claim 37, delete "((y+l(×t)" and insert -- ((y+l)×t) --, therefor.

UNITED STATES PATENT AND TRADEMARK OFFICE
CERTIFICATE OF CORRECTION

PATENT NO. : 7,120,248 B2
APPLICATION NO. : 09/818914
DATED : October 10, 2006
INVENTOR(S) : W. Dale Hopkins et al.

It is certified that error appears in the above-identified patent and that said Letters Patent is hereby corrected as shown below:

In column 33, line 3, in Claim 37, delete "ecponentiation" and insert -- exponentiation --, therefor.

In column 33, line 24, in Claim 38, delete "$n_{00}+2$" and insert -- $n_{0,0}+2$ --, therefor.

In column 33, lines 24-25, in Claim 38, delete "(y 2))" and insert -- (y·2)) --, therefor.

In column 34, line 38, in Claim 45, delete "(y 2))" and insert -- (y·2)) --, therefor.

In column 34, line 39, in Claim 45, delete "(y 2))" and insert -- (y·2)) --, therefor.

In column 34, line 39, in Claim 45, delete "$n_{(k-1,0}$" and insert -- $n_{(k-1),0}$ --, therefor.

In column 34, line 40, in Claim 45, delete "(y 2))" and insert -- (y·2)) --, therefor.

In column 34, line 66, in Claim 47, delete "as" and insert -- is --, therefor.

In column 35, line 11, in Claim 48, delete "numbers" and insert -- number s --, therefor.

In column 36, line 12, in Claim 50, delete "$n_{0,2}$," and insert -- $n_{0,2}$, --, therefor.

Signed and Sealed this

Fourth Day of August, 2009

JOHN DOLL
*Acting Director of the United States Patent and Trademark Office*